United States Patent [19]
Jannette et al.

[11] Patent Number: 5,761,063
[45] Date of Patent: Jun. 2, 1998

[54] DESIGN AND ENGINEERING PROJECT MANAGEMENT SYSTEM

[76] Inventors: Daniel A. Jannette, 876 Greenview Ct., Rochester Hills, Mich. 48307; Edwin M. Allen, 2462 Kingscross Dr., Shelby Township, Utica County, Mich. 48316; Mark F. Burnard, 2159 Durham, Shelby Township, Utica County, Mich. 48317; Jamie L. Crenshaw, 40256 Walter Dr., Sterling Heights, Mich. 48310; Curtis R. DeSaele, 4828 Kings Row, Shelby Township, Utica County, Mich. 48316; Michael E. Hill, 4381 Fox Lake Rd., Goodrich, Mich. 48438; Gerald O. Morrison, 20150 Plantation, Birmingham, Mich. 48025; Sonia Raheja, 7 Timberview Dr. #127, Rochester Hills, Mich. 48307; William G. Szuch, 2692 Tower Hill La., Rochester Hills, Mich. 48306; Paul W. Vickers, 1269 Kingsview, Rochester Hills, Mich. 48309; Mark S. Zaun, 4925 Whipple Lake Rd., Clarkston, Mich. 48348

[21] Appl. No.: 518,577

[22] Filed: Aug. 23, 1995

Related U.S. Application Data

[63] Continuation of Ser. No. 29,831, Mar. 11, 1993, abandoned.

[51] Int. Cl.[6] .................................................... G06F 17/00
[52] U.S. Cl. ............................................................ 364/468.03
[58] Field of Search ................................... 395/207, 201; 364/468, 468.03

[56] References Cited

U.S. PATENT DOCUMENTS

| | | | |
|---|---|---|---|
| 4,718,025 | 1/1988 | Minor et al. | 364/550 |
| 4,827,423 | 5/1989 | Beasley et al. | 364/468 |
| 4,864,507 | 9/1989 | Ebling et al. | 364/468 |
| 4,875,162 | 10/1989 | Ferriter et al. | 364/401 |
| 4,887,218 | 12/1989 | Natarajan | 364/468 |
| 5,006,990 | 4/1991 | Ward et al. | 364/768 |
| 5,050,088 | 9/1991 | Buckler et al. | 364/468 |
| 5,056,028 | 10/1991 | Ohta et al. | 364/468 |
| 5,063,506 | 11/1991 | Brockwell et al. | 364/402 |
| 5,089,970 | 2/1992 | Lee et al. | 364/468 |
| 5,121,330 | 6/1992 | Blaha et al. | 364/468 |
| 5,128,860 | 7/1992 | Chapman | 364/407 |
| 5,182,705 | 1/1993 | Barr et al. | 364/407 |
| 5,185,708 | 2/1993 | Hall et al. | 364/550 |
| 5,187,667 | 2/1993 | Short | 364/443 |
| 5,193,065 | 3/1993 | Guerindon et al. | 364/468 |
| 5,193,143 | 3/1993 | Kaemmerer | 395/51 |
| 5,195,041 | 3/1993 | George et al. | 364/468 |
| 5,212,791 | 5/1993 | Damian et al. | 395/650 |

*Primary Examiner*—Gopal C. Ray
*Assistant Examiner*—Xuong M. Chung-Trans
*Attorney, Agent, or Firm*—Brooks & Kushman P.C.

[57] ABSTRACT

A design and engineering project management system comprising a computer including a microprocessor, program memory, data storage memory, one or more displays, logic for identifying overall product objectives and group objectives relating to each of one or more subsystems or components of the overall product and displaying the overall objective and group objectives in a plurality of graphic windows which are quickly retrieved by the system operator, thereby integrating the diverse interests and activities of the groups into a comprehensive system design and implementation program. The system also preferably includes logic for identifying one or more strategies for achieving group objectives and presenting the strategies in a graphic form which allows for quick comparison of competing strategies. The system also preferably includes logic for quantitatively measuring progress toward each group's stated objectives and providing a plurality of graphic displays indicating each group's, and the entire project's toward its objectives.

20 Claims, 33 Drawing Sheets

| VEHICLE OBJECTIVES | | |
|---|---|---|
| | | DATE: |
| VEHICLE | | |

| MODELS | PLANNING VOLUMES | PLANNING YEAR |
|---|---|---|
| SEDAN<br>COUPE<br>UP-LEVEL<br>BASE LEVEL<br>• | | |

| OBJECTIVES | TARGETS | STATUS |
|---|---|---|
| BUSINESS<br><br>VARIABLE COST<br>INSTRUMENT COST<br>ASSEMBLY HOURS<br>•<br>•<br>• | | |
| TECHNICAL<br><br>MASS<br>FUEL ECONOMY<br>RELIABLITY<br>QUALITY<br>ASM PROCESSING & TOOLING<br>MFG PROCESSING & TOOLING<br>•<br>•<br>• | | |
| TIMING<br><br>PROGRAM DEFINITION<br>PROGRAM IMPLEMENTATION<br>THEME DECISION<br>PROGRAM CONFIRMATION<br>PROTOTYPE READINESS<br>ENGR/MRG DESIGN SIGN OFF<br>•<br>•<br>• | | | fig-4

| SYSTEM OBJECTIVES | | |
|---|---|---|
| | | DATE: |
| SYSTEM | | |

| MODELS | PLANNING VOLUMES | PLANNING YEAR |
|---|---|---|
| SEDAN<br>COUPE<br>UP-LEVEL<br>BASE LEVEL<br>• | | |

| OBJECTIVES | TARGETS | STATUS |
|---|---|---|
| BUSINESS<br><br>VARIABLE COST<br>INVESTMENT COST<br>ASSEMBLY HOURS<br>PART COUNT<br>• | | |
| TECHNICAL<br><br>MASS<br>BODY STIFFNESS<br>  BEAMING<br>  TORSION<br>NOISE LEVEL —72<br>ERGONOMICS<br>  FRONT SEAT LEG ROOM<br>  REAR SEAT LEG ROOM<br>  SHOULDER ROOM  —74<br>  HIP ROOM<br>  LUGGAGE VOLUME<br>  INTERIOR VOLUME<br>RELIABILITY<br>QUALITY<br>PROCESSING & TOOLING | | |
| TIMING<br><br>VEHICLE OBJECTIVES<br>SYSTEM OBJECTIVES<br>ENGINERING PLAN<br>MANUFACTURING PLAN<br>PRODUCTION TOOLING PLAN<br>ASSEMBLY PLAN<br>ASSEMBLY TOOLING PLAN<br>SP BUILD MRD<br>CP BUILD MRD<br>• | | |

70 fig-5

| COMPONENT OBJECTIVES | | |
|---|---|---|
| DATE: | | |
| COMPONENT | | |

| MODELS | PLANNING VOLUMES | PLANNING YEAR |
|---|---|---|
| SEDAN<br>COUPE<br>UP-LEVEL<br>BASE LEVEL<br>• | | |

| OBJECTIVES | TARGETS | STATUS |
|---|---|---|
| BUSINESS<br><br>VARIABLE COST<br>INVESTMENT COST<br>•<br>•<br>• | | |
| TECHNICAL<br><br>MATERIAL<br>MASS<br>PERFORMANCE<br>RELIABLITY<br>QUALITY<br>ASM PROCESSING & TOOLING<br>MFG PROCESSING & TOOLING<br>•<br>•<br>• | | |
| TIMING<br><br>SYSTEM OBJECTIVES<br>ENGINEERING PLAN<br>   STYLING APPROVAL<br>   SURFACE RELEASE<br>DEVELOPMENT/VALIDATION PLAN<br>MANUFACTURING/ SUPPLIER PLAN<br>   GAGE/FIXTURE PLAN<br>PRODUCTION TOOLING PLAN<br>ASSEMBLY PLAN<br>ASSEMBLY TOOLING PLAN<br>SP BUILD MRD<br>CP BUILD MRD<br>ISIR PLAN<br>• | | |

74 fig-6

| INTERFACE/INTEGRATION OBJECTIVES | | |
|---|---|---|
| | | DATE: |
| SYSTEMS | | |

| MODELS | PLANNING VOLUMES | PLANNING YEAR |
|---|---|---|
| SEDAN<br>COUPE<br>UP-LEVEL<br>BASE LEVEL<br>• | | |

| OBJECTIVES | TARGETS | STATUS |
|---|---|---|
| FIT & FINISH INTERFACE<br><br>BUMPER TO FENDER<br>BUMPER TO GOP<br>BUMPER TO LAMPS<br>   HEADLAMP<br>     SIDE MARKER LAMP<br>     TURN SIGNAL LAMP<br>•<br>• | | |
| FUNCTION INTEGRATION<br><br>STRUCTURAL LOAD REQUIREMENTS<br>ENERGY MANAGEMENT REQMTS.<br>•<br>•<br>• | | |
| TIMING<br><br>BODY STRUCTURE DATA<br>BODY EXTERIOR DATA<br>•<br>•<br>• | | | fig-10

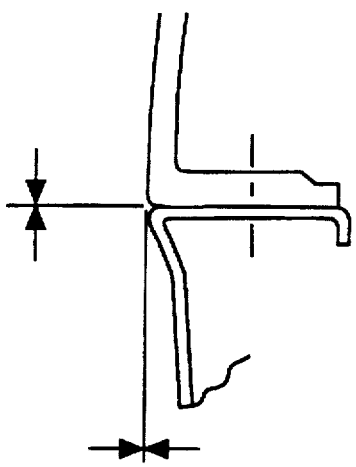
FENDER TO FASCIA GAP
| OBJECTIVE | -0.5 | 1.0 | 2.5 |
|---|---|---|---|
| LOCATION | LOW | MEAN | HIGH |
|---|---|---|---|
| PT 1 | -1.0 | 1.0 | 3.0 |
| PT 2 | -2.0 | 1.0 | 4.0 |
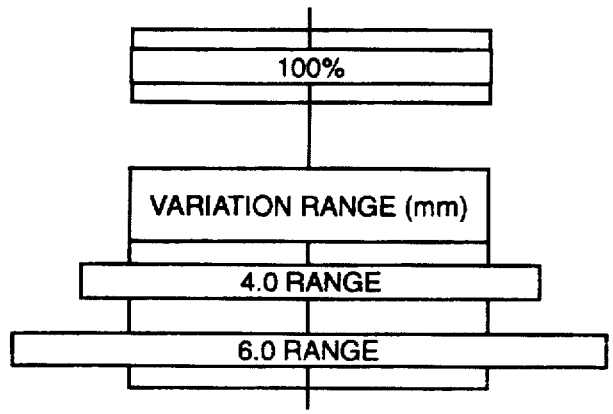
fig-12

| VEHICLE SUMMARY | ZOOM | CHASSIS | | | | | | |
|---|---|---|---|---|---|---|---|---|
| OBJECTIVES | TOTAL CHASSIS | FRAME BODY STRUCTURE | REAR SUSPENSION | FRONT SUSPENSION | BRAKE SYSTEM | STERING SYSTEM | WHEELS/ TIRES | ELECTRICAL |
| VARIABLE COSTS | $110.04 | $19.14 | $49.63 | $0.51 | $18.30 | $4.78 | $15.90 | $1.80 |
| INVESTMENT | $59,433.12 | $18,127.59 | $1,399.13 | $12,065.61 | 7,866.98 | $13,916.87 | $15,250.32 | $2,806.62 |
| TIMING | -1 | -1 | -1 | -1 | -1 | -1 | -1 | -1 |
| MASS | 78.47 | 17.55 | 16.11 | 17.68 | 6.58 | 12.11 | 1.65 | 4.79 |
| FLEX BUILD | -1 | -1 | -1 | -1 | -1 | -1 | -1 | -1 |
| ERGONOMICS | -1 | -1 | -1 | -1 | -1 | -1 | -1 | -1 |
| DIM. MGT. | -1 | -1 | -1 | -1 | -1 | -1 | -1 | -1 |
| DFA/DFM | -1 | -1 | -1 | -1 | -1 | -1 | -1 | -1 |
| RELIABILITY | -1 | -1 | -1 | -1 | -1 | -1 | -1 | -1 |
| SERVICEABILITY | -1 | -1 | -1 | -1 | -1 | -1 | -1 | -1 |

146 fig-15

| VEHICLE SUMMARY | ZOOM | HVAC | | | | | |
|---|---|---|---|---|---|---|---|
| OBJECTIVES | TOTAL HVAC | CLIMATE CONTROL MODULE | AIR INLET SYSTEM | REFRIGERANT SYSTEM | HEATER HOSE SYSTEM | AIR DISTRIBUTION SYSTEM | CLIMATE CONTROL SYSTEM |
| VARIABLE COSTS | $150.77 | $9.31 | $5.38 | $43.66 | $30.19 | $40.88 | $21.34 |
| INVESTMENT | $66,859.93 | $19,277.56 | $3,410.92 | $1,858.58 | $7,703.41 | $18,380.15 | $16,229.32 |
| TIMING | -1 | -1 | -1 | -1 | -1 | -1 | -1 |
| MASS | 51.77 | 2.98 | 1.34 | 10.81 | 9.91 | 11.46 | 15.26 |
| FLEX BUILD | -1 | -1 | -1 | -1 | -1 | -1 | -1 |
| ERGONOMICS | -1 | -1 | -1 | -1 | -1 | -1 | -1 |
| DIM. MGT. | -1 | -1 | -1 | -1 | -1 | -1 | -1 |
| DFA/DFM | -1 | -1 | -1 | -1 | -1 | -1 | -1 |
| RELIABILITY | -1 | -1 | -1 | -1 | -1 | -1 | -1 |
| SERVICEABILITY | -1 | -1 | -1 | -1 | -1 | -1 | -1 |

148 fig-16

| VEHICLE SUMMARY | ZOOM | POWERTRAIN | | | | | | | |
|---|---|---|---|---|---|---|---|---|---|
| OBJECTIVES | TOTAL POWERTRAIN | ENGINE | EMMISON CONTROL SYSTEM | FUEL SYSTEM | TRANSMISSION | TRANSMISSION CONTROL SYSTEM | EXHAUST SYSTEM | COOLING SYSTEM | ENGINE CONTROL SYSTEM | ELECTRICAL |
| VARIABLE COSTS | $187.03 | $26.55 | $0.03 | $2.75 | $21.04 | $5.77 | $47.84 | $22.06 | $27.23 | $33.75 |
| INVESTMENT | $205,736.85 | $29,203.67 | $35.56 | $3,030.47 | $23,142.87 | $6,351.92 | $52,628.80 | $24,269.43 | $29,947.93 | $37,126.21 |
| TIMING | -: | -: | -: | -: | -: | -: | -: | -: | -: | -: |
| MASS | 919.84 | 19.44 | 169.59 | 162.98 | 15.20 | 161.93 | 120.72 | 124.51 | 114.67 | 30.79 |
| FLEX BUILD | -: | -: | -: | -: | -: | -: | -: | -: | -: | -: |
| ERGONOMICS | -: | -: | -: | -: | -: | -: | -: | -: | -: | -: |
| DIM. MGT. | -: | -: | -: | -: | -: | -: | -: | -: | -: | -: |
| DFA/DFM | -: | -: | -: | -: | -: | -: | -: | -: | -: | -: |
| RELIABILITY | -: | -: | -: | -: | -: | -: | -: | -: | -: | -: |
| SERVICEABILITY | -: | -: | -: | -: | -: | -: | -: | -: | -: | -: |

150 fig-17

| VEHICLE SUMMARY | ZOOM | INTERIOR | | | | | | | | | | |
|---|---|---|---|---|---|---|---|---|---|---|---|---|
| OBJECTIVES | TOTAL INTERIOR | INTRUMENT PANEL | CONSOLE(S) | DOOR TRIM | SEAT ASSEMBLY(S) | UPPER SHELL TRIM | LOWER SHELL TRIM | ACOUSTICS | HEADLINER/ VISORS | CARPET | RESTRAINT SYSTEM | INTERIOR LIGHTING SYSTEM | ELECTRICAL |
| VARIABLE COSTS | $303.83 | $31.61 | $9.33 | $28.92 | $49.74 | $33.05 | $44.96 | $2.31 | $8.39 | $12.96 | $18.25 | $40.49 | $23.84 |
| INVESTMENT | $107,124.58 | $6,106.37 | $5,685.20 | $10,879.10 | $5,168.76 | $9,397.74 | $19,148.69 | $4,356.97 | $9,862.24 | $10,639.13 | $10,473.29 | $7,815.00 | $7,563.10 |
| TIMING | -' | -' | -' | -' | -' | -' | -' | -' | -' | -' | -' | -' | -' |
| MASS | 136.05 | 2.11 | 6.06 | 9.70 | 10.96 | 19.50 | 19.52 | 5.91 | 17.58 | 6.79 | 18.13 | 5.93 | 13.87 |
| FLEX BUILD | -' | -' | -' | -' | -' | -' | -' | -' | -' | -' | -' | -' | -' |
| ERGONOMICS | -' | -' | -' | -' | -' | -' | -' | -' | -' | -' | -' | -' | -' |
| DIM. MGT. | -' | -' | -' | -' | -' | -' | -' | -' | -' | -' | -' | -' | -' |
| DFA/DFM | -' | -' | -' | -' | -' | -' | -' | -' | -' | -' | -' | -' | -' |
| RELIABILITY | -' | -' | -' | -' | -' | -' | -' | -' | -' | -' | -' | -' | -' |
| SERVICEABILITY | -' | -' | -' | -' | -' | -' | -' | -' | -' | -' | -' | -' | -' |

152 fig-18

| VEHICLE SUMMARY | ZOOM | EXTERIOR | | | | | |
|---|---|---|---|---|---|---|---|
| OBJECTIVES | TOTAL EXTERIOR | FRONT END SHEET METAL | BUMPER SYSTEMS | EXTERIOR LIGHTING | EXTERIOR TRIM/ MOLDINGS | BODY CLOSURES/ SEALING | ELECTRICAL |
| VARIABLE COSTS | $117.56 | $23.94 | $47.56 | $2.89 | $33.67 | $23.04 | $46.46 |
| INVESTMENT | $46,784.29 | $5,821.65 | $2,811.39 | $3,510.27 | $15,453.51 | $15,842.49 | $3,344.98 |
| TIMING | - | - | - | - | - | - | - |
| MASS | 75.35 | 18.09 | 7.45 | 13.59 | 11.73 | 14.50 | 11.99 |
| FLEX BUILD | - | - | - | - | - | - | - |
| ERGONOMICS | - | - | - | - | - | - | - |
| DIM. MGT. | - | - | - | - | - | - | - |
| DFA/DFM | - | - | - | - | - | - | - |
| RELIABILITY | - | - | - | - | - | - | - |
| SERVICEABILITY | - | - | - | - | - | - | - |

154 fig-19

| VEHICLE SUMMARY | ZOOM | ELECTRICAL | | | | | | | | |
|---|---|---|---|---|---|---|---|---|---|---|
| OBJECTIVES | TOTAL ELECTRICAL | ENTERTAINMENT SYSTEM | FRONT END WIRING SYSTEMS | FRONT OF DASH WIRING SYSTEM | I/P WIRING SYSTEM | BODY WIRING SYSTEM | REAR END WIRING SYSTEMS | ELECTRICAL CONTROL MODULES | ACTUATORS | RELAYS | SOLENOIDS |
| VARIABLE COSTS | $273.25 | $9.41 | $40.25 | $39.85 | $20.52 | $39.42 | $48.39 | $24.23 | $26.30 | $15.86 | $9.03 |
| INVESTMENT | $113,373.04 | $10,194.32 | $17,564.80 | $19,290.36 | $11,320.33 | $19,004.06 | $5,793.74 | $12,522.83 | $14,773.57 | $2,481.94 | $467.08 |
| TIMING | -: | -: | -: | -: | -: | -: | -: | -: | -: | -: | -: |
| MASS | 97.21 | 15.08 | 2.89 | 16.23 | 17.29 | 8.98 | 2.97 | 17.68 | 1.07 | 6.75 | 7.40 |
| FLEX BUILD | -: | -: | -: | -: | -: | -: | -: | -: | -: | -: | -: |
| ERGONOMICS | -: | -: | -: | -: | -: | -: | -: | -: | -: | -: | -: |
| DIM. MGT. | -: | -: | -: | -: | -: | -: | -: | -: | -: | -: | -: |
| DFA/DFM | -: | -: | -: | -: | -: | -: | -: | -: | -: | -: | -: |
| RELIABILITY | -: | -: | -: | -: | -: | -: | -: | -: | -: | -: | -: |
| SERVICEABILITY | -: | -: | -: | -: | -: | -: | -: | -: | -: | -: | -: |

156 fig-20

| VEHICLE SUMMARY | ZOOM | BODY IN WHITE | | | | | | | | | | | |
|---|---|---|---|---|---|---|---|---|---|---|---|---|---|
| OBJECTIVES | TOTAL BIW | UNDERBODY | FRONT END STRUCTURE | FRONT OF DASH | DOOR STRUCTURE | SIDE SILLS | HINGE PILLARS | ROOF | QUARTER | REAR END PANEL | DECK LID | GLASS SYSTEM | HARDWARE SYSTEM | WIPER SYSTEM | ELECTRICAL |
| VARIABLE COSTS | $310.76 | $26.55 | $0.03 | $2.75 | $21.04 | $5.77 | $47.84 | $22.06 | $27.23 | $0.35 | $20.80 | $7.34 | $48.79 | $46.44 | $33.75 |
| INVESTMENT | $341,835.49 | $29,203.67 | $35.56 | $3,030.47 | $23,142.87 | $6,351.92 | $52,626.80 | $24,269.43 | $29,947.93 | $396.46 | $22,862.75 | $8,071.86 | $53,671.10 | $51,066.49 | $37,126.21 |
| TIMING | - | - | - | - | - | - | - | - | - | - | - | - | - | - | - |
| MASS | 1527.99 | 112.32 | 42.37 | 25.14 | 98.48 | 46.90 | 119.58 | 145.17 | 131.06 | 184.41 | 142.69 | 50.95 | 173.60 | 177.98 | 77.32 |
| FLEX BUILD | - | - | - | - | - | - | - | - | - | - | - | - | - | - | - |
| ERGONOMICS | - | - | - | - | - | - | - | - | - | - | - | - | - | - | - |
| DIM. MGT. | - | - | - | - | - | - | - | - | - | - | - | - | - | - | - |
| DFA/DFM | - | - | - | - | - | - | - | - | - | - | - | - | - | - | - |
| RELIABILITY | - | - | - | - | - | - | - | - | - | - | - | - | - | - | - |
| SERVICEABILITY | - | - | - | - | - | - | - | - | - | - | - | - | - | - | - |

158 fig-21

| VEHICLE SUMMARY | ZOOM | GRAPHS | VARIABLE COSTS DETAIL |

| TARGETS | $375.00 | $230.00 | $36.70 | $76.30 | $40.00 | $90.00 | $80.00 | |
|---|---|---|---|---|---|---|---|---|
| DATE | BODY IN WHITE | ELECTRICAL | EXTERIOR | INTERIOR | HVAC | POWERTRAIN | CHASSIS | TOTAL |
| 01/04/93 | $116.53 | $34.38 | $26.38 | $39.53 | $36.71 | $99.05 | $104.09 | $456.67 |
| 01/11/93 | $84.55 | $46.23 | $24.93 | $34.81 | $35.63 | $52.10 | $189.95 | $468.20 |
| 01/18/93 | $146.84 | $21.67 | $25.31 | $19.79 | $38.43 | $81.95 | $102.84 | $436.82 |
| 01/25/93 | $123.61 | $27.75 | $31.02 | $5.09 | $30.08 | $87.75 | $69.19 | $374.49 |
| 02/01/93 | $143.38 | $28.74 | $14.10 | $53.75 | $34.45 | $39.75 | $43.34 | $357.51 |
| 02/08/93 | $104.54 | $44.22 | $15.15 | $28.87 | $37.98 | $41.69 | $23.97 | $296.42 |
| 02/15/93 | $66.27 | $18.02 | $29.01 | $13.87 | $44.18 | $46.26 | $142.38 | $360.00 |
| 02/22/93 | $69.33 | $16.84 | $30.71 | $62.28 | $43.32 | $41.19 | $85.15 | $348.81 |
| 03/01/93 | $92.64 | $43.33 | $38.36 | $16.49 | $34.04 | $53.45 | $163.64 | $441.95 |
| 03/08/93 | $127.16 | $34.66 | $12.49 | $47.21 | $46.51 | $129.14 | $92.95 | $490.12 |
| 03/15/93 | $123.10 | $48.53 | $13.71 | $28.12 | $48.74 | $56.39 | $92.66 | $411.23 |
| 03/22/93 | $141.90 | $35.28 | $12.92 | $42.57 | $30.62 | $129.04 | $72.00 | $464.34 |
| 03/29/93 | $119.15 | $20.70 | $31.18 | $31.66 | $42.51 | $138.29 | $11.87 | $395.35 |
| 04/05/93 | $119.61 | $45.43 | $18.35 | $5.59 | $47.63 | $110.06 | $206.27 | $552.94 |
| 04/12/93 | $140.77 | $38.25 | $12.66 | $52.69 | $40.37 | $35.47 | $175.56 | $495.77 |
| 04/19/93 | $96.02 | $36.60 | $35.29 | $62.99 | $34.66 | $131.94 | $14.13 | $411.63 |
| 04/26/93 | $83.84 | $39.05 | $37.09 | $45.67 | $29.38 | $22.38 | $84.91 | $342.32 |
| 05/03/93 | $124.07 | $25.68 | $26.65 | $12.30 | $20.24 | $110.08 | $123.30 | $442.32 |
| 05/10/93 | $117.71 | $43.53 | $21.67 | $60.24 | $29.86 | $116.61 | $162.95 | $552.58 |
| 05/17/93 | $61.37 | $35.57 | $27.99 | $13.07 | $30.57 | $40.49 | $45.90 | $254.97 |
| 05/24/93 | $122.65 | $27.84 | $33.14 | $57.42 | $46.69 | $123.86 | $29.62 | $441.22 |
| 05/31/93 | $57.73 | $20.80 | $23.79 | $18.12 | $25.75 | $104.83 | $153.41 | $404.44 |
| 06/07/93 | $127.38 | $41.94 | $29.01 | $5.92 | $20.50 | $42.95 | $176.71 | $444.41 |
| 06/14/93 | $142.64 | $38.19 | $33.66 | $44.83 | $46.03 | $55.34 | $51.70 | $412.41 |
| 06/21/93 | $146.52 | $47.76 | $18.84 | $48.33 | $48.97 | $110.84 | $42.89 | $464.16 |
| 06/28/93 | $112.78 | $32.43 | $18.66 | $26.34 | $28.07 | $39.93 | $155.99 | $414.20 |
| 07/05/93 | $118.19 | $37.31 | $15.46 | $37.40 | $38.06 | $127.61 | $88.71 | $462.73 |
| 07/12/93 | $119.52 | $41.73 | $27.47 | $12.82 | $41.19 | $107.10 | $65.90 | $415.73 |
| 07/19/93 | $141.39 | $45.78 | $16.23 | $52.29 | $43.26 | $101.46 | $71.59 | $471.99 |
| 07/26/93 | $56.40 | $18.46 | $12.69 | $22.73 | $43.61 | $71.00 | $140.40 | $365.29 |
| 08/02/93 | $113.59 | $24.71 | $14.30 | $74.82 | $40.83 | $53.72 | $120.82 | $442.79 |
| 08/09/93 | $146.68 | $34.72 | $37.07 | $34.06 | $28.70 | $96.40 | $72.87 | $450.50 |
| 08/16/93 | $68.19 | $30.09 | $39.84 | $15.71 | $29.08 | $63.84 | $12.59 | $259.34 |
| 08/23/93 | $130.79 | $33.02 | $29.78 | $45.57 | $21.26 | $83.68 | $66.03 | $410.13 |
| 08/30/93 | $112.02 | $25.48 | $21.31 | $20.85 | $39.58 | $74.39 | $44.93 | $338.57 |
| 09/06/93 | $53.83 | $31.90 | $22.62 | $68.08 | $43.72 | $133.86 | $206.99 | $561.01 |
| 09/13/93 | $62.86 | $35.14 | $36.70 | $7.50 | $28.46 | $56.09 | $112.77 | $339.54 |
| 09/20/93 | $53.12 | $16.52 | $26.33 | $45.66 | $22.44 | $53.59 | $42.23 | $259.88 |
| 09/27/93 | $86.92 | $17.19 | $24.78 | $40.63 | $37.60 | $52.77 | $182.91 | $442.80 |
| 10/04/93 | $145.65 | $39.31 | $26.77 | $56.92 | $23.91 | $60.12 | $152.63 | $505.29 |
| 10/11/93 | $136.34 | $16.65 | $36.35 | $9.07 | $25.94 | $106.36 | $169.01 | $499.73 |
| 10/18/93 | $115.59 | $40.59 | $11.24 | $26.25 | $41.05 | $46.34 | $128.40 | $409.47 |
| 10/25/93 | $86.72 | $38.67 | $35.49 | $71.83 | $30.67 | $61.96 | $206.63 | $531.96 |
| 11/01/93 | $101.82 | $19.20 | $24.68 | $65.10 | $49.42 | $45.78 | $144.17 | $450.16 |
| 11/08/93 | $74.57 | $26.56 | $30.81 | $54.32 | $28.55 | $92.76 | $128.18 | $435.75 |
| 11/15/93 | $85.38 | $28.12 | $15.94 | $43.15 | $33.49 | $97.57 | $133.91 | $437.57 |
| 11/22/93 | $134.86 | $49.99 | $26.71 | $34.61 | $37.07 | $25.10 | $137.96 | $446.30 |
| 11/29/93 | $77.03 | $30.09 | $14.01 | $69.66 | $42.90 | $111.49 | $165.98 | $511.16 |
| 12/06/93 | $136.48 | $38.08 | $34.62 | $19.66 | $35.81 | $103.42 | $87.15 | $457.21 |
| 12/13/93 | $104.69 | $33.25 | $34.31 | $64.63 | $38.68 | $92.91 | $18.12 | $386.60 |
| 12/20/93 | $129.77 | $37.50 | $24.23 | $41.61 | $37.58 | $75.30 | $148.79 | $494.79 |
| 12/27/93 | $100.97 | $16.75 | $14.91 | $30.12 | $39.52 | $127.86 | $152.45 | $482.59 | fig-22

| VEHICLE SUMMARY | ZOOM | GRAPHS | INVESTMENT DETAIL |

TARGETS $340,000 $150,000 $50,000 $100,000 $120,000 $200,000 $30,000

| DATE | BODY IN WHITE | ELECTRICAL | EXTERIOR | INTERIOR | HVAC | POWERTRAIN | CHASSIS | TOTAL |
|---|---|---|---|---|---|---|---|---|
| 01/04/93 | $323,242 | $80,531 | $58,539 | $113,646 | $68,592 | $217,492 | $13,478 | $875,520 |
| 01/11/93 | $347,288 | $105,640 | $51,196 | $108,439 | $86,812 | $186,190 | $26,715 | $912,280 |
| 01/18/93 | $352,888 | $94,756 | $63,177 | $91,730 | $54,745 | $203,382 | $18,609 | $879,287 |
| 01/25/93 | $359,089 | $113,178 | $37,498 | $117,705 | $80,351 | $187,106 | $48,350 | $943,276 |
| 02/01/93 | $352,271 | $112,006 | $58,273 | $92,388 | $53,602 | $208,932 | $14,897 | $892,368 |
| 02/08/93 | $342,520 | $116,526 | $68,634 | $87,548 | $76,301 | $185,239 | $39,350 | $916,119 |
| 02/15/93 | $344,418 | $97,605 | $65,274 | $100,849 | $80,378 | $216,114 | $36,995 | $941,632 |
| 02/22/93 | $322,191 | $114,982 | $62,339 | $112,889 | $60,524 | $206,137 | $28,699 | $907,761 |
| 03/01/93 | $331,751 | $94,913 | $37,225 | $103,597 | $73,746 | $209,536 | $44,201 | $894,968 |
| 03/08/93 | $322,088 | $114,717 | $60,722 | $80,524 | $68,252 | $212,219 | $19,757 | $878,279 |
| 03/15/93 | $382,566 | $96,665 | $44,051 | $81,491 | $74,252 | $213,182 | $42,686 | $880,892 |
| 03/22/93 | $340,568 | $83,779 | $45,266 | $104,126 | $79,096 | $217,785 | $45,259 | $915,878 |
| 03/29/93 | $356,036 | $99,970 | $67,545 | $104,766 | $59,319 | $185,411 | $40,497 | $913,545 |
| 04/05/93 | $325,366 | $107,088 | $31,833 | $119,242 | $72,039 | $204,004 | $22,314 | $881,886 |
| 04/12/93 | $357,206 | $81,312 | $36,382 | $108,031 | $58,243 | $193,960 | $42,556 | $877,692 |
| 04/19/93 | $348,593 | $101,442 | $45,655 | $118,294 | $80,441 | $193,925 | $47,405 | $935,754 |
| 04/26/93 | $352,000 | $91,549 | $61,107 | $105,271 | $67,197 | $190,937 | $45,661 | $913,722 |
| 05/03/93 | $341,731 | $90,513 | $56,342 | $105,578 | $87,037 | $207,468 | $11,393 | $900,062 |
| 05/10/93 | $352,213 | $110,918 | $69,144 | $84,845 | $84,227 | $187,825 | $33,482 | $922,654 |
| 05/17/93 | $350,641 | $119,848 | $32,879 | $92,266 | $78,935 | $216,432 | $14,512 | $905,513 |
| 05/24/93 | $356,519 | $104,027 | $39,786 | $104,487 | $64,256 | $190,485 | $11,566 | $871,127 |
| 05/31/93 | $350,557 | $91,868 | $38,624 | $91,405 | $62,620 | $219,488 | $21,371 | $875,934 |
| 06/07/93 | $345,463 | $114,861 | $39,209 | $106,308 | $74,079 | $214,151 | $42,337 | $936,407 |
| 06/14/93 | $341,088 | $80,870 | $46,314 | $112,918 | $78,952 | $197,181 | $35,955 | $893,278 |
| 06/21/93 | $356,468 | $81,779 | $55,458 | $91,790 | $87,368 | $218,432 | $40,090 | $931,384 |
| 06/28/93 | $321,219 | $88,028 | $33,056 | $118,600 | $58,164 | $186,936 | $36,623 | $842,625 |
| 07/05/93 | $358,830 | $92,515 | $33,455 | $96,793 | $59,672 | $202,312 | $45,996 | $889,573 |
| 07/12/93 | $344,308 | $116,386 | $35,335 | $97,124 | $74,867 | $198,048 | $31,109 | $897,177 |
| 07/19/93 | $328,721 | $119,179 | $69,997 | $86,553 | $83,411 | $219,152 | $23,105 | $930,117 |
| 07/26/93 | $333,091 | $85,867 | $44,011 | $99,037 | $83,045 | $206,690 | $31,523 | $883,263 |
| 08/02/93 | $324,189 | $113,255 | $48,755 | $90,678 | $62,882 | $191,685 | $11,336 | $842,779 |
| 08/09/93 | $334,677 | $108,268 | $59,317 | $111,760 | $51,056 | $190,908 | $29,349 | $885,334 |
| 08/16/93 | $320,154 | $100,602 | $35,278 | $98,152 | $69,258 | $207,020 | $42,487 | $872,952 |
| 08/23/93 | $335,550 | $82,261 | $65,863 | $94,591 | $56,636 | $205,623 | $10,446 | $850,971 |
| 08/30/93 | $323,415 | $116,455 | $31,985 | $112,336 | $55,585 | $211,643 | $15,230 | $866,649 |
| 09/06/93 | $356,569 | $88,393 | $47,635 | $93,701 | $61,893 | $217,634 | $10,049 | $875,873 |
| 09/13/93 | $327,642 | $100,424 | $53,175 | $85,962 | $51,785 | $186,413 | $10,112 | $815,513 |
| 09/20/93 | $347,969 | $104,085 | $42,990 | $117,138 | $88,313 | $180,611 | $47,768 | $928,874 |
| 09/27/93 | $348,383 | $111,492 | $40,020 | $96,141 | $79,655 | $201,563 | $44,553 | $921,807 |
| 10/04/93 | $324,359 | $118,634 | $39,663 | $89,822 | $71,755 | $190,101 | $22,586 | $856,921 |
| 10/11/93 | $338,060 | $103,019 | $55,566 | $119,358 | $67,866 | $191,703 | $27,853 | $903,425 |
| 10/18/93 | $339,724 | $88,213 | $69,765 | $88,551 | $77,452 | $198,528 | $47,863 | $910,096 |
| 10/25/93 | $340,968 | $97,740 | $39,734 | $86,471 | $86,967 | $210,818 | $36,182 | $898,881 |
| 11/01/93 | $342,423 | $90,868 | $64,778 | $96,998 | $75,013 | $210,187 | $26,333 | $906,601 |
| 11/08/93 | $328,282 | $82,763 | $44,323 | $97,715 | $64,378 | $207,267 | $27,587 | $852,314 |
| 11/15/93 | $350,190 | $81,521 | $30,563 | $80,707 | $73,426 | $196,250 | $25,107 | $837,764 |
| 11/22/93 | $353,046 | $104,573 | $68,004 | $117,699 | $59,396 | $198,784 | $36,990 | $938,491 |
| 11/29/93 | $345,136 | $86,969 | $62,354 | $102,102 | $56,046 | $209,765 | $10,667 | $873,039 |
| 12/06/93 | $345,184 | $84,030 | $51,322 | $110,408 | $58,193 | $207,479 | $11,188 | $867,804 |
| 12/13/93 | $328,743 | $80,884 | $39,760 | $115,480 | $75,611 | $180,652 | $23,873 | $845,003 |
| 12/20/93 | $346,490 | $111,368 | $31,702 | $94,201 | $88,817 | $194,837 | $43,853 | $911,267 |
| 12/27/93 | $336,871 | $98,812 | $41,765 | $82,012 | $69,228 | $190,709 | $34,961 | $854,359 | fig-23

| VEHICLE SUMMARY | ZOOM | GRAPHS | TIMING DETAIL |

NUMBERS INDICATE NUMBER OF WEEKS EARLY TO SCHEDULE.
NEGATIVE NUMBERS INDICATE SLIPPAGE.

TARGETS  0.00  0.00  0.00  0.00  0.00  0.00  0.00

| DATE | BODY IN WHITE | ELECTRICAL | EXTERIOR | INTERIOR | HVAC | POWERTRAIN | CHASSIS | AVERAGE |
|---|---|---|---|---|---|---|---|---|
| 01/04/93 | -3.00 | -3.00 | -3.00 | -3.00 | -3.00 | -3.00 | -3.00 | -3.00 |
| 01/11/93 | -2.00 | -2.00 | -2.00 | -3.00 | -2.00 | -2.00 | -3.00 | -2.29 |
| 01/18/93 | -2.00 | -2.00 | -2.00 | -2.00 | -2.00 | -2.00 | -3.00 | -2.00 |
| 01/25/93 | -2.00 | -1.00 | -2.00 | -1.00 | -1.00 | -1.00 | -3.00 | -1.57 |
| 02/01/93 | -2.00 | -1.00 | -2.00 | -1.00 | -1.00 | 0.00 | -2.00 | -1.29 |
| 02/08/93 | -2.00 | -1.00 | -2.00 | -1.00 | -1.00 | 0.00 | -2.00 | -1.29 |
| 02/15/93 | -2.00 | -1.00 | -2.00 | -1.00 | -1.00 | 0.00 | -2.00 | -1.29 |
| 02/22/93 | -2.00 | 0.00 | -1.00 | -1.00 | 0.00 | 0.00 | -2.00 | -0.86 |
| 03/01/93 | -1.00 | 0.00 | -1.00 | -1.00 | 0.00 | 0.00 | -1.00 | -0.57 |
| 03/08/93 | -1.00 | 0.00 | 0.00 | 0.00 | 0.00 | 1.00 | -1.00 | -0.14 |
| 03/15/93 | -1.00 | 0.00 | 0.00 | 0.00 | 0.00 | 1.00 | -1.00 | -0.14 |
| 03/22/93 | -1.00 | 0.00 | 0.00 | 0.00 | 0.00 | 1.00 | -1.00 | -0.14 |
| 03/29/93 | 0.00 | 0.00 | 0.00 | 0.00 | 0.00 | 1.00 | 0.00 | 0.14 |
| 04/05/93 | 0.00 | 1.00 | 0.00 | 0.00 | 1.00 | 2.00 | 1.00 | 0.71 |
| 04/12/93 | 1.00 | 1.00 | 0.00 | 0.00 | 2.00 | 2.00 | 1.00 | 1.00 |
| 04/19/93 | 1.00 | 1.00 | 0.00 | 1.00 | 3.00 | 2.00 | 2.00 | 1.43 |
| 04/26/93 | 1.00 | 2.00 | 1.00 | 1.00 | 3.00 | 2.00 | 2.00 | 1.71 |
| 05/03/93 | 1.00 | 2.00 | 1.00 | 1.00 | 3.00 | 2.00 | 2.00 | 1.71 |
| 05/10/93 | 2.00 | 2.00 | 1.00 | 1.00 | 3.00 | 2.00 | 3.00 | 2.00 |
| 05/17/93 | 3.00 | 2.00 | 1.00 | 1.00 | 4.00 | 3.00 | 3.00 | 2.43 |
| 05/24/93 | 3.00 | 2.00 | 1.00 | 1.00 | 5.00 | 3.00 | 4.00 | 2.71 |
| 05/31/93 | 3.00 | 2.00 | 2.00 | 1.00 | 5.00 | 4.00 | 4.00 | 3.00 |
| 06/07/93 | 4.00 | 2.00 | 2.00 | 2.00 | 5.00 | 4.00 | 4.00 | 3.29 |
| 06/14/93 | 4.00 | 3.00 | 3.00 | 2.00 | 5.00 | 5.00 | 5.00 | 3.86 |
| 06/21/93 | 4.00 | 3.00 | 3.00 | 2.00 | 5.00 | 5.00 | 5.00 | 3.86 |
| 06/28/93 | 5.00 | 4.00 | 4.00 | 2.00 | 5.00 | 6.00 | 6.00 | 4.57 |
| 07/05/93 | 5.00 | 4.00 | 5.00 | 3.00 | 6.00 | 6.00 | 6.00 | 5.00 |
| 07/12/93 | 6.00 | 4.00 | 5.00 | 3.00 | 6.00 | 6.00 | 7.00 | 5.29 |
| 07/19/93 | 7.00 | 4.00 | 5.00 | 3.00 | 7.00 | 7.00 | 7.00 | 5.71 |
| 07/26/93 | 8.00 | 5.00 | 5.00 | 3.00 | 7.00 | 8.00 | 8.00 | 6.29 |
| 08/02/93 | 8.00 | 6.00 | 5.00 | 4.00 | 8.00 | 8.00 | 9.00 | 6.86 |
| 08/09/93 | 8.00 | 7.00 | 5.00 | 4.00 | 8.00 | 9.00 | 10.00 | 7.29 |
| 08/16/93 | 9.00 | 7.00 | 5.00 | 4.00 | 8.00 | 9.00 | 11.00 | 7.57 |
| 08/23/93 | 10.00 | 8.00 | 5.00 | 4.00 | 8.00 | 9.00 | 12.00 | 8.00 |
| 08/30/93 | 10.00 | 9.00 | 5.00 | 4.00 | 8.00 | 9.00 | 13.00 | 8.29 |
| 09/06/93 | 10.00 | 9.00 | 6.00 | 4.00 | 8.00 | 9.00 | 13.00 | 8.43 |
| 09/13/93 | 10.00 | 9.00 | 6.00 | 5.00 | 9.00 | 10.00 | 13.00 | 8.86 |
| 09/20/93 | 10.00 | 10.00 | 6.00 | 6.00 | 9.00 | 10.00 | 13.00 | 9.14 |
| 09/27/93 | 10.00 | 10.00 | 7.00 | 6.00 | 9.00 | 10.00 | 14.00 | 9.43 |
| 10/04/93 | 10.00 | 10.00 | 8.00 | 6.00 | 9.00 | 11.00 | 14.00 | 9.71 |
| 10/11/93 | 11.00 | 11.00 | 8.00 | 6.00 | 9.00 | 11.00 | 14.00 | 10.00 |
| 10/18/93 | 11.00 | 11.00 | 8.00 | 6.00 | 9.00 | 12.00 | 14.00 | 10.14 |
| 10/25/93 | 12.00 | 11.00 | 8.00 | 6.00 | 9.00 | 13.00 | 14.00 | 10.43 |
| 11/01/93 | 12.00 | 11.00 | 8.00 | 6.00 | 9.00 | 13.00 | 15.00 | 10.57 |
| 11/08/93 | 12.00 | 11.00 | 8.00 | 7.00 | 9.00 | 14.00 | 16.00 | 11.00 |
| 11/15/93 | 13.00 | 12.00 | 8.00 | 7.00 | 9.00 | 14.00 | 16.00 | 11.29 |
| 11/22/93 | 13.00 | 12.00 | 8.00 | 7.00 | 9.00 | 14.00 | 16.00 | 11.29 |
| 11/29/93 | 13.00 | 12.00 | 8.00 | 7.00 | 9.00 | 15.00 | 16.00 | 11.43 |
| 12/06/93 | 14.00 | 12.00 | 8.00 | 8.00 | 10.00 | 15.00 | 16.00 | 11.86 |
| 12/13/93 | 15.00 | 12.00 | 8.00 | 8.00 | 10.00 | 16.00 | 16.00 | 12.14 |
| 12/20/93 | 15.00 | 12.00 | 8.00 | 8.00 | 10.00 | 16.00 | 16.00 | 12.14 |
| 12/27/93 | 15.00 | 12.00 | 8.00 | 8.00 | 10.00 | 16.00 | 17.00 | 12.29 | fig-24

| VEHICLE SUMMARY | ZOOM | GRAPHS | MASS DETAIL |

168

| TARGETS | 101.12 | 34.50 | 36.70 | 76.30 | 40.00 | 90.00 | 80.00 | |
|---|---|---|---|---|---|---|---|---|
| DATE | BODY IN WHITE | ELECTRICAL | EXTERIOR | INTERIOR | HVAC | POWERTRAIN | CHASSIS | TOTAL |
| 01/04/93 | 116.53 | 34.38 | 26.38 | 39.53 | 36.71 | 99.05 | 104.09 | 456.67 |
| 01/11/93 | 84.55 | 46.23 | 24.93 | 34.81 | 35.63 | 52.10 | 189.95 | 468.20 |
| 01/18/93 | 146.84 | 21.67 | 25.31 | 19.79 | 38.43 | 81.95 | 102.84 | 436.82 |
| 01/25/93 | 123.61 | 27.75 | 31.02 | 5.09 | 30.08 | 87.75 | 69.19 | 374.49 |
| 02/01/93 | 143.38 | 28.74 | 14.10 | 53.75 | 34.45 | 39.75 | 43.34 | 357.51 |
| 02/08/93 | 104.54 | 44.22 | 15.15 | 28.87 | 37.98 | 41.69 | 23.97 | 296.42 |
| 02/15/93 | 66.27 | 18.02 | 29.01 | 13.87 | 44.18 | 46.26 | 142.38 | 360.00 |
| 02/22/93 | 69.33 | 16.84 | 30.71 | 62.28 | 43.32 | 41.19 | 85.15 | 348.81 |
| 03/01/93 | 92.64 | 43.33 | 38.36 | 16.49 | 34.04 | 53.45 | 163.64 | 441.95 |
| 03/08/93 | 127.16 | 34.66 | 12.49 | 47.21 | 46.51 | 129.14 | 92.95 | 490.12 |
| 03/15/93 | 123.10 | 48.53 | 13.71 | 28.12 | 48.74 | 56.39 | 92.66 | 411.23 |
| 03/22/93 | 141.90 | 35.28 | 12.92 | 42.57 | 30.62 | 129.04 | 72.00 | 464.34 |
| 03/29/93 | 119.15 | 20.70 | 31.18 | 31.66 | 42.51 | 138.29 | 11.87 | 395.35 |
| 04/05/93 | 119.61 | 45.43 | 18.35 | 5.59 | 47.63 | 110.06 | 206.27 | 552.94 |
| 04/12/93 | 140.77 | 38.25 | 12.66 | 52.69 | 40.37 | 35.47 | 175.56 | 495.77 |
| 04/19/93 | 96.02 | 36.60 | 35.29 | 62.99 | 34.66 | 131.94 | 14.13 | 411.63 |
| 04/26/93 | 83.84 | 39.05 | 37.09 | 45.67 | 29.38 | 22.38 | 84.91 | 342.32 |
| 05/03/93 | 124.07 | 25.68 | 26.65 | 12.30 | 20.24 | 110.08 | 123.30 | 442.32 |
| 05/10/93 | 117.71 | 43.53 | 21.67 | 60.24 | 29.86 | 116.61 | 162.95 | 552.58 |
| 05/17/93 | 61.37 | 35.57 | 27.99 | 13.07 | 30.57 | 40.49 | 45.90 | 254.97 |
| 05/24/93 | 122.65 | 27.84 | 33.14 | 57.42 | 46.69 | 123.86 | 29.62 | 441.22 |
| 05/31/93 | 57.73 | 20.80 | 23.79 | 18.12 | 25.75 | 104.83 | 153.41 | 404.44 |
| 06/07/93 | 127.38 | 41.94 | 29.01 | 5.92 | 20.50 | $42.95 | 176.71 | 444.41 |
| 06/14/93 | 142.64 | 38.19 | 33.66 | 44.83 | 46.03 | 55.34 | 51.70 | 412.41 |
| 06/21/93 | 146.52 | 47.76 | 18.84 | 48.33 | 48.97 | 110.84 | 42.89 | 464.16 |
| 06/28/93 | 112.78 | 32.43 | 18.66 | $26.34 | 28.07 | $39.93 | 155.99 | 414.20 |
| 07/05/93 | 118.19 | 37.31 | 15.46 | 37.40 | 38.06 | 127.61 | 88.71 | 462.73 |
| 07/12/93 | 119.52 | 41.73 | 27.47 | 12.82 | 41.19 | 107.10 | 65.90 | 415.73 |
| 07/19/93 | 141.39 | 45.78 | 16.23 | 52.29 | 43.26 | 101.46 | 71.59 | 471.99 |
| 07/26/93 | 56.40 | 18.46 | 12.69 | 22.73 | 43.61 | 71.00 | 140.40 | 365.29 |
| 08/02/93 | 113.59 | 24.71 | 14.30 | 74.82 | 40.83 | 53.72 | 120.82 | 442.79 |
| 08/09/93 | 146.68 | 34.72 | 37.07 | 34.06 | 28.70 | 96.40 | 72.87 | 450.50 |
| 08/16/93 | 68.19 | 30.09 | 39.84 | 15.71 | 29.08 | 63.84 | 12.59 | 259.34 |
| 08/23/93 | 130.79 | 33.02 | 29.78 | 45.57 | 21.26 | 83.68 | 66.03 | 410.13 |
| 08/30/93 | 112.02 | 25.48 | 21.31 | 20.85 | 39.58 | 74.39 | 44.93 | 338.57 |
| 09/06/93 | 53.83 | 31.90 | 22.62 | 68.08 | 43.72 | 133.86 | 206.99 | 561.01 |
| 09/13/93 | 62.86 | 35.14 | 36.70 | 7.50 | 28.46 | 56.09 | 112.77 | 339.54 |
| 09/20/93 | 53.12 | 16.52 | 26.33 | 45.66 | 22.44 | 53.59 | 42.23 | 259.88 |
| 09/27/93 | 86.92 | 17.19 | 24.78 | 40.63 | 37.60 | 52.77 | 182.91 | 442.80 |
| 10/04/93 | 145.65 | 39.31 | 26.77 | 56.92 | 23.91 | 60.12 | 152.63 | 505.29 |
| 10/11/93 | 136.34 | 16.65 | 36.35 | 9.07 | 25.94 | 106.36 | 169.01 | 499.73 |
| 10/18/93 | 115.59 | 40.59 | 11.24 | 26.25 | 41.05 | 46.34 | 128.40 | 409.47 |
| 10/25/93 | 86.72 | 38.67 | 35.49 | 71.83 | 30.67 | 61.96 | 206.63 | 531.96 |
| 11/01/93 | 101.82 | 19.20 | 24.68 | 65.10 | 49.42 | 45.78 | 144.17 | 450.16 |
| 11/08/93 | 74.57 | 26.56 | 30.81 | 54.32 | 28.55 | 92.76 | 128.18 | 435.75 |
| 11/15/93 | 85.38 | 28.12 | 15.94 | 43.15 | 33.49 | 97.57 | 133.91 | 437.57 |
| 11/22/93 | 134.86 | 49.99 | 26.71 | 34.61 | 37.07 | 25.10 | 137.96 | 446.30 |
| 11/29/93 | 77.03 | 30.09 | 14.01 | 69.66 | 42.90 | 111.49 | 165.98 | 511.16 |
| 12/06/93 | 138.48 | 38.08 | 34.62 | 19.66 | 35.81 | 103.42 | 87.15 | 457.21 |
| 12/13/93 | 104.69 | 33.25 | 34.31 | 64.63 | 38.68 | 92.91 | 18.12 | 386.60 |
| 12/20/93 | 129.77 | 37.50 | 24.23 | 41.61 | 37.58 | 75.30 | 148.79 | 494.79 |
| 12/27/93 | 100.97 | 16.75 | 14.91 | 30.12 | 39.52 | 127.86 | 152.45 | 482.59 |

166 fig-25 fig-31

DESIGN AND ENGINEERING PROJECT MANAGEMENT SYSTEM

This is a continuation Ser. No. 08/029,831 filed on Mar. 11, 1993, abandoned.

TECHNICAL FIELD

The present invention relates to design and engineering project management systems and, more particularly, to a computerized system for the integrated planning and implementation of a multi-component product design and engineering project.

BACKGROUND ART

The design and engineering of a multi-component product, such as an automobile, typically involves the simultaneous product development activities of many, often technically diverse, business groups. Such projects are often marked by failure to meet various project objectives, such as production costs and time schedules, and may result in the design of components which are incompatible with the overall product.

Several factors contribute to the failure to meet overall product design and production objectives in a multi-component product manufacturing project. A product design and engineering project for complex products such as an automobile is typically subdivided among separate operating groups, often separate business entities, each of which has responsibility for one or more components (or subsystems) of the product. For example, one group may be responsible for the design and engineering of the powertrain components of a vehicle, another group for the electrical system, another group the body structure, another for the interior, another for the exterior, another group for the chassis, etc.

While some overall vehicle, subsystem, and component objectives may be established at the onset of the project, each of the groups often completes the design and/or engineering of their subsystem by changing or sacrificing one or more of their objectives, or changing the design or process of production for their subsystem, without communicating the changes to the other groups or to those responsible for the completed product. While these changes may be acceptable to the group responsible for the particular subsystem, the effect of these changes on other related subsystems, and a cumulative impact of changes on the overall product is often not appreciated or considered until late in the project.

Variation in the objectives and/or strategies of a particular group during the project may also affect the ability of another group to reach its objectives. For example, a slight, but non-critical change in the design of a sidewall trim component might be implemented without jeopardizing any of the objectives for that component. However, that change may create a fatal incompatibility with the instrument panel component of the same vehicle. Thus, the failure to timely communicate changes in design and/or implementation by the individual groups can have a ripple affect on the other groups which, if discovered too late in the project, can contribute to the failure of one or more of the groups in meeting their objectives.

Similarly, while a cost overrun, an increase in component weight, or a subtle change in design of a particular component may result in a particular group meeting the majority of their stated objectives within an acceptable variance, the cumulative affect of these variances may result in an unexpected failure to meet overall vehicle objectives. For example, each group might meet all of its objectives except for cost, resulting in an unacceptable overrun on the entire project. Alternatively, if enough groups exceed their weight objectives, though by a relatively small amount, the cumulative affect may be a vehicle that is significantly, and unacceptably, overweight.

These problems, inherent in the production of a multi-component product, underscore a need for clearly defined system and component objectives that meet the overall vehicle definition at the onset.

There is also a need to identify the diverse but interrelated interests and goals of each of the separate operating groups and/or business entities involved in the project.

There is also a need to monitor and assess performance in relation to each group's stated objectives during the project.

There is also a need for facilitating communication between the separate groups at all times during the project so the impact of changes in one group's strategy and/or objectives on any other group can be identified early in the process.

There is also a need for communication by each of the groups to the overall product management level of variances in the objectives and/or strategies implemented by the groups, so that the impact of such variations on the overall product can be quickly identified and assessed.

Finally, there is a need for a comprehensive integrated management system which identifies and tracks overall and individual group objectives and strategies for meeting those objectives, and which evaluates each group's progress, and the effects of that progress and/or any variances in the group's strategies or objectives on the other groups, and on the overall project, on an ongoing basis.

SUMMARY OF THE INVENTION

One object of the present invention is to provide a design and engineering project planning and management system which ensures an integrated and coordinated implementation of a multi-component design and engineering project.

Another object of the present invention is to provide a system for integrated planning and implementation of a multi-component design and engineering project which identifies a clearly defined overall product definition and objectives.

It is another object of the present invention to provide a multi-component project management system which identifies clearly defined objectives for each of the subsystems and components of the overall product.

Yet another object of the present invention is to provide a project management system which identifies one or more strategies which may be implemented to achieve the objectives identified for each subsystem and/or component of the overall product.

Still another object of the present invention is to provide a project management system which provides ongoing monitoring and evaluation of the performance of each of the groups responsible for subsystems and/or components so that potential problem areas can be quickly identified and avoided.

It is yet another object of the present invention to provide a project management system having a user interface which provides quick and easy access to project evaluations and project data at varying levels of detail for the entire vehicle, the individual vehicle systems, subsystems, and components.

It is yet another object of the present invention to provide a project management system which identifies the interrelation of one subsystem and/or component to the other and which quickly communicates changes of one group's project objectives and/or strategies to affected groups to minimize any problems created thereby.

Yet another object of the present invention is to provide a project management system which provides a standardized process for simultaneous product development by each of the groups responsible for development of one or more subsystems and/or components of that product.

A still further object of the present invention is to provide a project management system which integrates diverse interests and groups into a comprehensive system design and implementation program to yield a finished product which satisfies the overall product objectives and meets the product definition.

According to the present invention, a system for planning and managing a multi-component product design and engineering project is provided. The system includes a computer having a microprocessor, program memory, data storage memory, one or more displays, logic for identifying overall product objectives and means for displaying each of the objectives, logic for identifying group objectives relating to each of one or more subsystems or components of the overall product, and means for displaying each of these group objectives, logic for identifying one or more strategies for achieving the group objectives, and means for displaying each of the strategies, logic for monitoring the performance of each group during the project by measuring progress toward that group's stated objectives, and means for displaying a graphical indication of each group's progress toward its objectives.

The system of the present invention also preferably includes logic for evaluating the alternative strategies defined for a group and comparing the current progress of the alternative strategy towards the stated objectives with the current progress of the chosen strategy, and means for displaying a graphical indication of the current status of each of the competing alternative strategies for a group.

The system of the present invention also preferably includes logic for tracking those components or factors in one group's strategy which affect another group's strategy, and communicating any variance in the status of each group's objectives to other groups affected by such variances. This system also preferably includes logic for weighing each of the predefined factors for each strategy on an ongoing basis and determining when an alternative strategy is preferable, and means for graphically indicating the new optimal strategy for each group necessitated by that group or another group's changing objectives during the project implementation.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 4 is a vehicle objectives window;

FIG. 5 is a system objectives window;

FIG. 6 is a component objectives window;

FIG. 10 is a system interface/integration objectives window;

FIG. 12 is a components interface detail window;

FIG. 15 is a chassis system summary window;

FIG. 16 is a HVAC system summary window;

FIG. 17 is a powertrain system summary window;

FIG. 18 is an interior system summary window;

FIG. 19 is an exterior system summary window;

FIG. 20 is an electrical system summary window;

FIG. 21 is a body-in-white system summary window;

FIG. 22 is a system variable costs detail window;

FIG. 23 is a system investment detail window;

FIG. 24 is a system timing window;

FIG. 25 is a system mass detail window;

FIG. 31 is another alternative embodiment of a vehicle summary window;

BEST MODE FOR CARRYING OUT THE INVENTION

Figure 1:
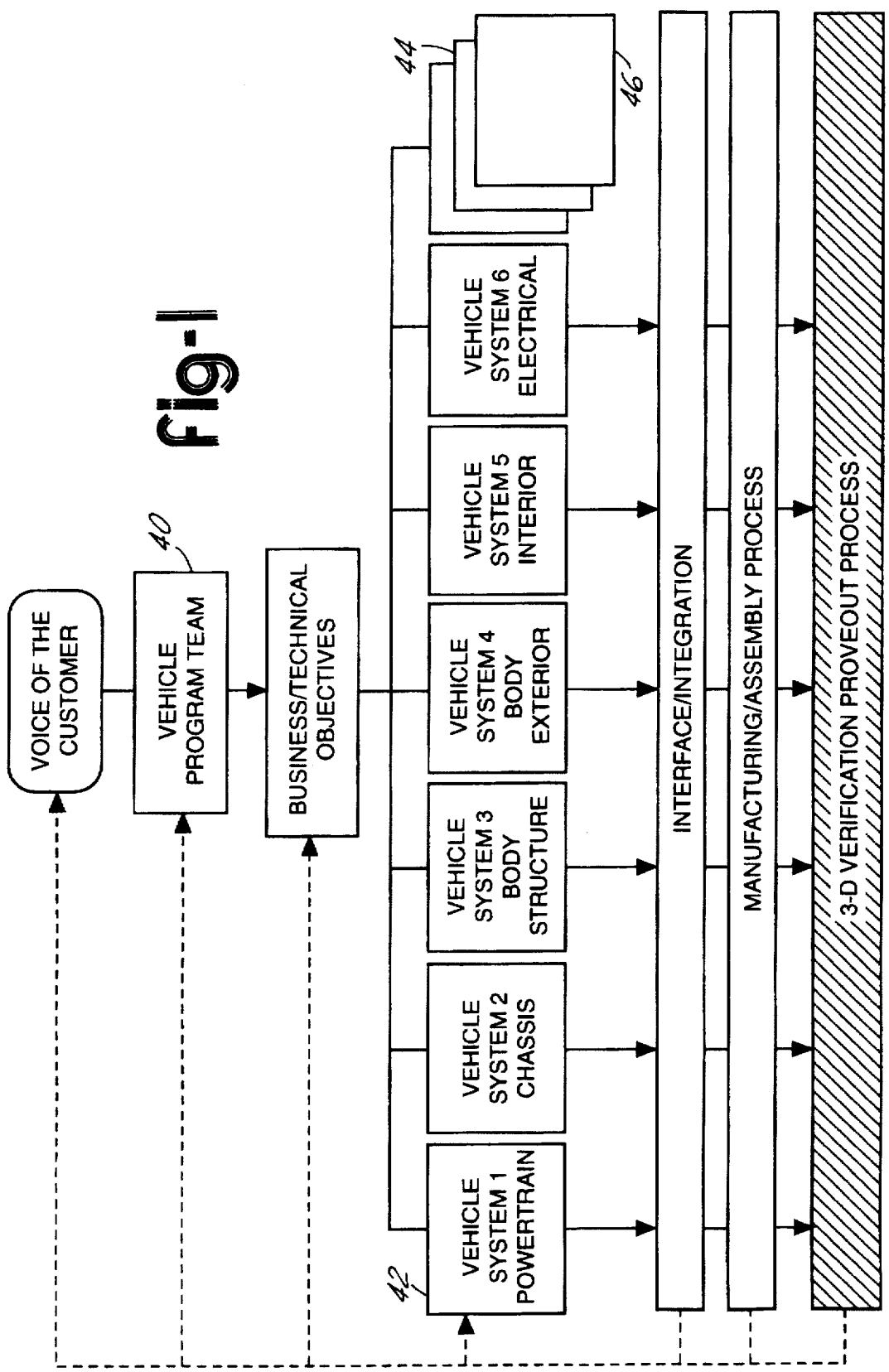
FIG. 1 is a conceptual diagram illustrating the information flow in a typical organizational structure for a design/engineering project using the project management system of the present invention.

Referring to FIG. 1, the project management system of the present invention is a computer-based project information management tool useful in the design and engineering of multi-component products, such as automotive vehicles. The structure of an organization involved in the design and engineering of a multi-component product, such as a vehicle, is characterized by separate groups or teams, often from different disciplines, and with responsibilities ranging from the design and engineering of the entire vehicle to the design and engineering of a single one of its thousands of parts.

The management system of the present invention provides an environment in which the team responsible for the entire vehicle, the vehicle program team 40, as well as each of the vehicle system teams 42, subsystem teams 44, and component teams 46 can define, quantify, and prioritize vehicle, system, subsystem and component objectives, as well as monitor the status of each team's toward these objectives during the project in an integrated fashion.

The system of the present provides an interface which allows for the quick and easy access of project information, ranging from high level, total vehicle status information to details, such as current expected variable costs for particular components. This information is organized and presented by the system in such a manner that all project teams are able to obtain continual, integrated feedback of the progress of the project at all levels.

Figure 2:
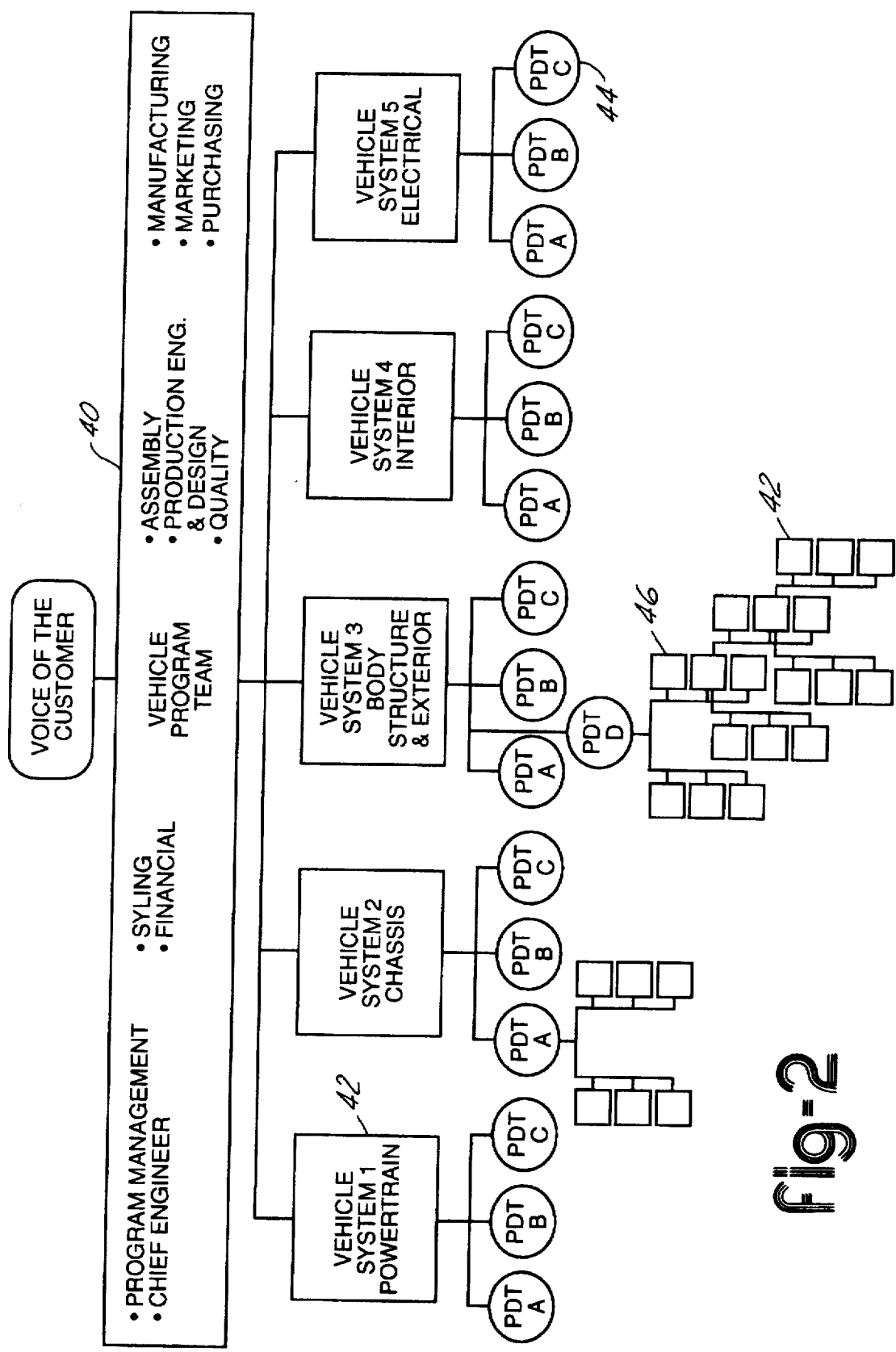
FIG. 2 is a diagram showing a more detailed organizational structure for a typical design/engineering project.

As shown in greater detail in FIG. 2, the management structure for a vehicle design/engineering program typically includes a vehicle program team 40 having members representing all of the diverse business and technical disciplines involved in the design, engineering, manufacturing, production and sale of the product. These program stake holders are preferably all involved in defining the project objective at the total vehicle level.

In the product example shown, the next layer of project management typically comprises a plurality of vehicle system groups 42, such as the powertrain, chassis, body structure and exterior, interior, and electrical groups. The next layer of the project organization which is typically integrated into the project management system are the subsystem groups 44, referred to as product development teams (PDT's). These groups have responsibility for system subassemblies within the different vehicle system teams 42. The next layer of organization typically comprises component teams 46 which are responsible for the design and engineering of the component assemblies which are integrated by the project development teams into the system subassemblies. Another lower level product management team, the component team 48, may have responsibility for the design and engineering of individual components.

It will be appreciated by those skilled in the art that, depending on the type and complexity of the product, a design and engineering project supported by the system of the present invention may have greater or fewer organizational sub-levels depending on the number and complexity of the components which make up the product. Regardless of the size of the organizational structure, the project management system of the present invention provides a tool for organizing a consistent, integrated, and objective product, subassembly, and component definition. In addition, the interface provided by the system allows for integrated monitoring and tracking during the execution of the project at all levels of the organization, thereby providing the opportunity for implementing and optimizing product strategy.

Figure 3:
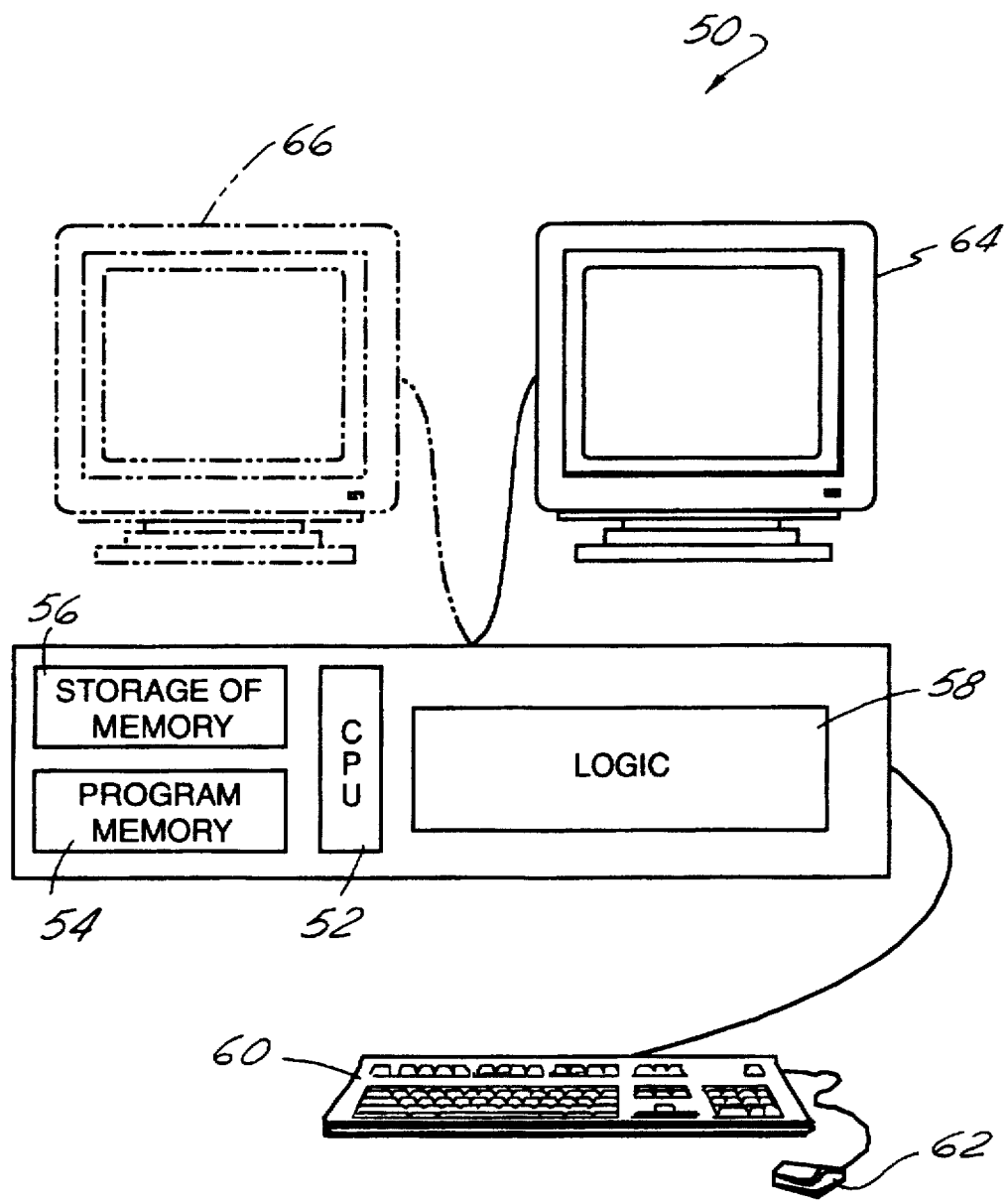
FIG. 3 is a schematic representation of the project management system of the present invention.

Referring now to FIG. 3, the project management system of the present invention, generally referred to as 50, includes a computer having one or more microprocessors 52, program memory 54, storage memory 56, program logic 58, at least one data input means such as a keyboard 60 and/or a mouse 62, and one or more displays 64, 66. The system includes logic for identifying overall project objectives and means for displaying each of these objectives, logic for identifying group objectives relating to each of one or more subsystems or components of the overall product and means for displaying each of these group objectives, logic for identifying one or more strategies for achieving group objectives and means for displaying each of the strategies, and logic for monitoring the performance of each group during the project by recording progress toward that group's stated objectives and displaying each group's progress in a graphical form.

The system may also include a scanner (not shown) for scanning in graphics for use in the system's displays.

The system also preferably includes logic for simultaneously monitoring any alternative strategies, evaluating those strategies and displaying the evaluation factors and results for the alternative strategies to facilitate quick examination of project progress and suggest selection of the optimal strategy for achieving the project objectives.

The system also preferably includes logic for identifying system-to-system and component-to-component interrelationships, monitoring the change in status of the interfaces, evaluating the affect of any change in the interfaces based upon predefined factors, and displaying the evaluation factors and results for each interface.

In one embodiment, the system is implemented on a conventional personal computer having a Motorola 80486 microprocessor (or functional equivalent) utilizing a conventional spreadsheet program, such as Quatro Pros® by Borland, in a Microsoft Windows® operating environment. It is contemplated, however, that more complex implementations of the system for a product including, for example, thousands of component parts, and with many objectives, alternative strategies, and many system-to-system and component-to-component interfaces, would be implemented on a larger computer having 100 megabytes or more of storage memory, a plurality of displays, and wherein the logic is implemented using a more versatile programming language such as C, CH, or Fortran. It is also contemplated that the system may utilize and/or incorporate other project management software such as, for example, Viewpoint®, to perform some of the system functions described herein, or to provide adjunct functions consistent with the project management objectives of this system.

The display means for the system of the present invention preferably includes multiple windows which may be easily selected, resized, and/or moved to provide quick and easy access to project information at all the various levels of detail. In one embodiment, the interface is implemented in the Microsoft Windows® environment. These windows may be called by a predetermined keystroke for display on a single CRT display 64, or may be displayed on one of a plurality of displays (shown as displays 64 and 66 in FIG. 3 or as displays 150 in FIGS. 32–34) to facilitate the rapid desemination of project information to the system operator.

The system 50 of the present invention preferably provides a plurality of "Objectives" windows which, when activated by the operator, allow for input, and subsequent review, of project objectives, display the established for those objectives, and an indication of the current status regarding that objective.

The Vehicle Objectives window 68 of FIG. 4 illustrates some typical objectives which might be defined by the project stakeholders at the vehicle team level. Typical business objectives include variable costs, investment costs and assembly hours targets. Typical technical objectives include a total vehicle mass, fuel economy, reliability, quality, assembly processing and tooling costs and manufacturing processing and tooling costs targets.

It should be noted that the units for measuring progress toward the objectives may vary according to the nature of the objective. For example, cost objectives would typically be quantified in dollars, vehicle mass in pounds, fuel economy in miles per gallon, and timing objectives in any one of the generally accepted units of time, such as weeks, months, man-weeks or man-months. Other traditionally non-quantitative objectives such as quality or reliability might be measured in arbitrary units established and defined by the project teams. However these objectives are measured, it is preferable that the same units be used by each of the teams to allow for easy integration of the data at and across all levels of the project.

In addition to defining objectives and quantifying targets for the objectives, the system preferably allows for a weighting or prioritization of the individual objectives. This may be illustrated on the Vehicle Objectives window 68, for example, merely by the order in which the objectives appear on the list, or by color-coding the objective to indicate the relative importance to the project.

FIG. 5 illustrates another objectives window, the System Objectives window 70. The system 50 preferably includes a plurality of System Objectives windows 70, corresponding to each of the system teams included in the project, such as, for example, powertrain, chassis, body, interior, electrical, etc. As with the Vehicle Objectives window 68, each System Objectives window 70 includes the common objectives established by the vehicle team stakeholders, the targets established for those objectives for the particular system team, and the status of the system team's progress toward meeting the objectives.

It preferably includes additional objectives establishing a more detailed criteria for meeting the more general vehicle objectives. For example, the interior systems group might establish noise level and ergonomics objectives and targets (shown at 72) which form additional objective criteria for assessing the overall quality objectives for the system team. Similarly, an additional level of more detailed objectives (shown at 74) such as front seat leg room, shoulder room, etc. might be established as further quantitative criteria defining the ergonomics objective.

FIG. 6 illustrates a Component Objectives window 74. The system 50 typically includes a plurality of Component Objectives windows corresponding to each of the component teams of the project. Again, the window would illustrate all of the objectives which are common to that component team's system team and the vehicle team, as well as additional objectives establishing more detailed criteria for those common objectives.

It will be appreciated by those skilled in the art that additional objective windows would typically be provided for each of the teams at each of the levels in the project structure. For example, in the vehicle project illustrated in FIG. 2, the system 50 would include a series of subsystem objectives windows (not shown), each corresponding to the product development team comprising the subsystem groups 44. As will also be appreciated by those skilled in the art, the objectives windows 68, 70 and 74 of the present invention allow project personnel utilizing the system 50 to review the targets and status of the project quickly and easily, and at selected levels of detail by simply switching from window to window. The establishment of common objectives and criteria for measuring progress toward the associated targets for those objectives provides a comprehensive, integrated view of the status of the project.

Figure 7:
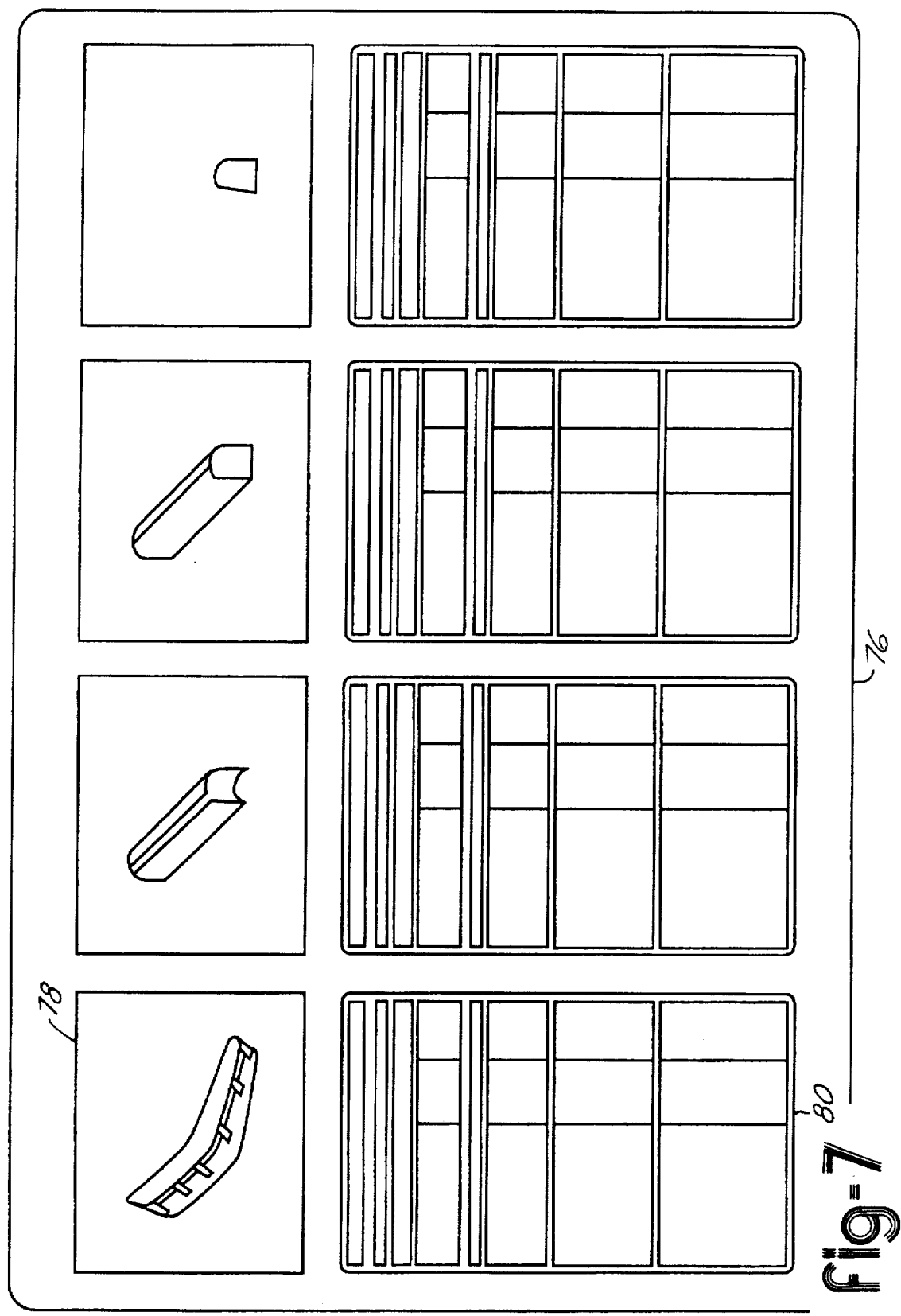
FIG. 7 is an alternative component display.

FIG. 7 illustrates a component display 76 which may be provided by the system 50 of the present invention to indicate some or all of the components in a particular component group, along with the associated component objectives. This display preferably consists of a view (usually a perspective view) of the particular component 78 accompanied by a reduced-sized component objectives display 80 associated with that component. This display provides the operator with information relating to objectives and the current status is attaining those objectives, for each component. As an alternative, or in addition to, the component display shown in FIG. 7, an alternative components display (not shown) may be provided by the system 50 which, in the format shown in FIG. 7, displays a view of each of the alternative designs for one particular component along with the component objectives for each of the alternative designs. In addition to quickly determining the status for that component, the operator could also then view the alternative designs and objectives which might be considered in the event a particular component proves unacceptable.

Figure 8:
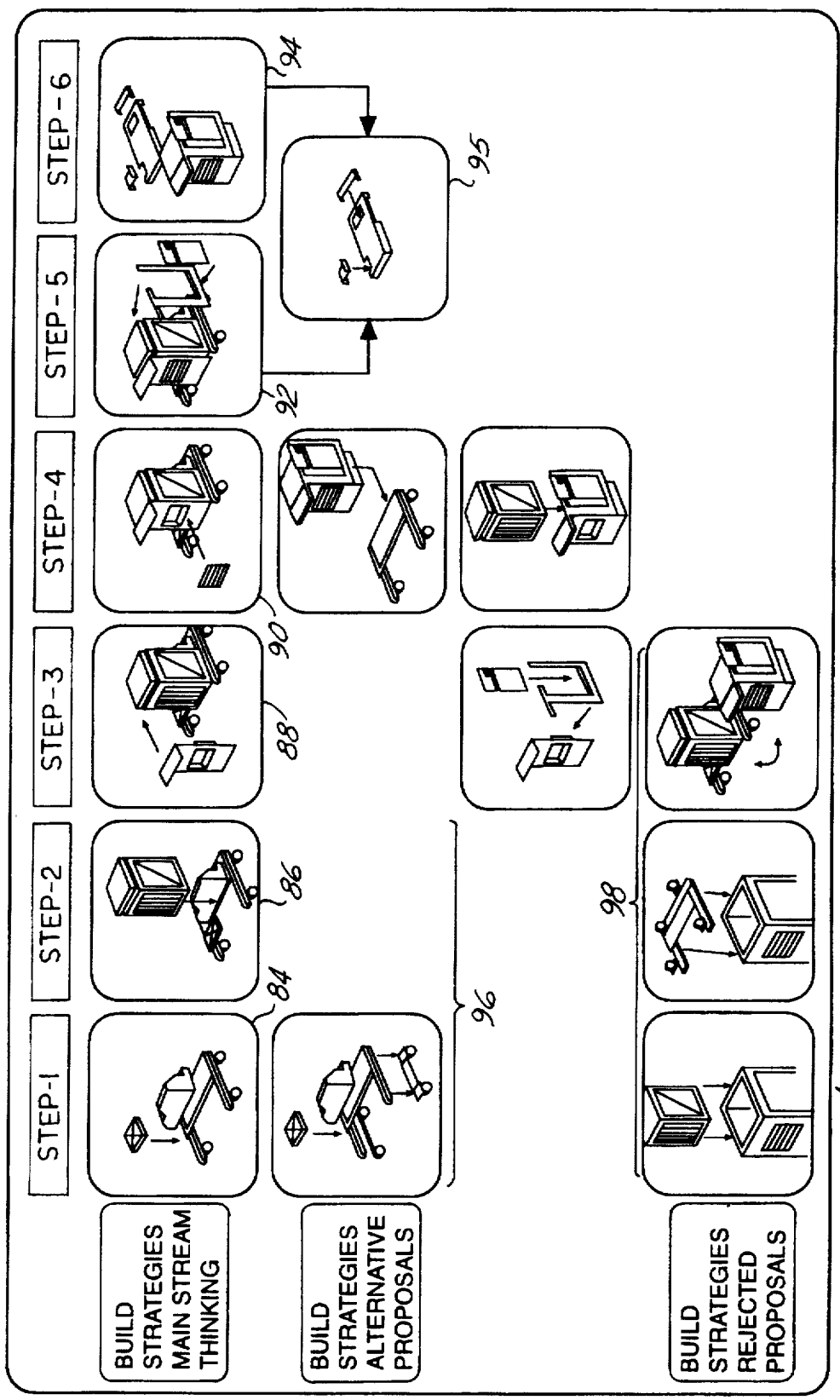
FIG. 8 is a system build strategies window.

Referring now to FIG. 8, the system 50 may also provide a system Build Strategies window 82, which identifies the currently "selected" build strategy for a product, as well as any alternative strategies and/or rejected strategies developed for the product. The System Build Strategies window 82 typically includes a plurality of sub-windows, each corresponding to a step in the assembly sequence or a sub-assembly at each of a plurality of assembly stations. The hypothetical product shown in FIG. 8 illustrates various generic sub-assemblies such as the assembly of the base portion of the product (Step 1), integrating the major operating portion of the product with the base (at Step 2), and assembly of an exterior shell structure with the operating portion and base portion of the product (Steps 3–6). The Build Stragegies window could also be subdivided by project group (such as each vehicle systems group) with each column representing that project group's portion of the product assembly.

FIG. 8 illustrates the current selected build strategy for the imaginary product at the top row of the window with sub-windows 84–94 showing six major assembly steps. In addition, alternative build strategies and/or assembly sequences are illustrated in the additional sub-windows 96. Alternative Build Strategies for sequences for components can also be shown in intermediate fashion, such as the pre-assembly of various top outer shell components shown in sub-window 95. In this manner, a different manner or sequence of assembly of components can be displayed for consideration. Rejected build strategies may also be illustrated, as shown in sub-windows 98.

As shown in FIG. 8, each of the individual component assembly strategies may be represented by a unique graphic icon associated with the strategy. Alternatively, the sub-windows 84–98 for each of the strategies could be a miniature representation of the System Objectives window corresponding to that strategy. Further information about each strategy may be quickly obtained by clicking on the sub-window corresponding to the selected strategy. This further information could be in the form of a full-sized objectives window corresponding to the selected build strategy. In the alternative, the Subsystem Build strategies window for the selected build strategy could be displayed.

It will be appreciated by those skilled in the art that a plurality of Build Strategies windows may be provided, corresponding to each group level of a project, such as subsystems and component assemblies. These build strategy displays may be integrated as described above, thereby allowing an operator to view, for example, the current build strategy for the vehicle, click-on the interior system to view the current build strategy for each of the subsystems which comprise the interior, and again click-on one of the subsystem build strategies to view, for example, the current build strategy for the instrument panel. Again, in a matter of clicks or keystrokes, a system operator can view the current and alternative build strategies, as well as the status of each of the group's implementing those strategies at every level of detail in the project. In addition, the operator can view the objectives displays corresponding to various alternative build strategies to determine whether, for example, the targets for alternative strategies might indicate adoption of that strategy as the newly selected strategy in light of the current status of the project.

Figure 9:
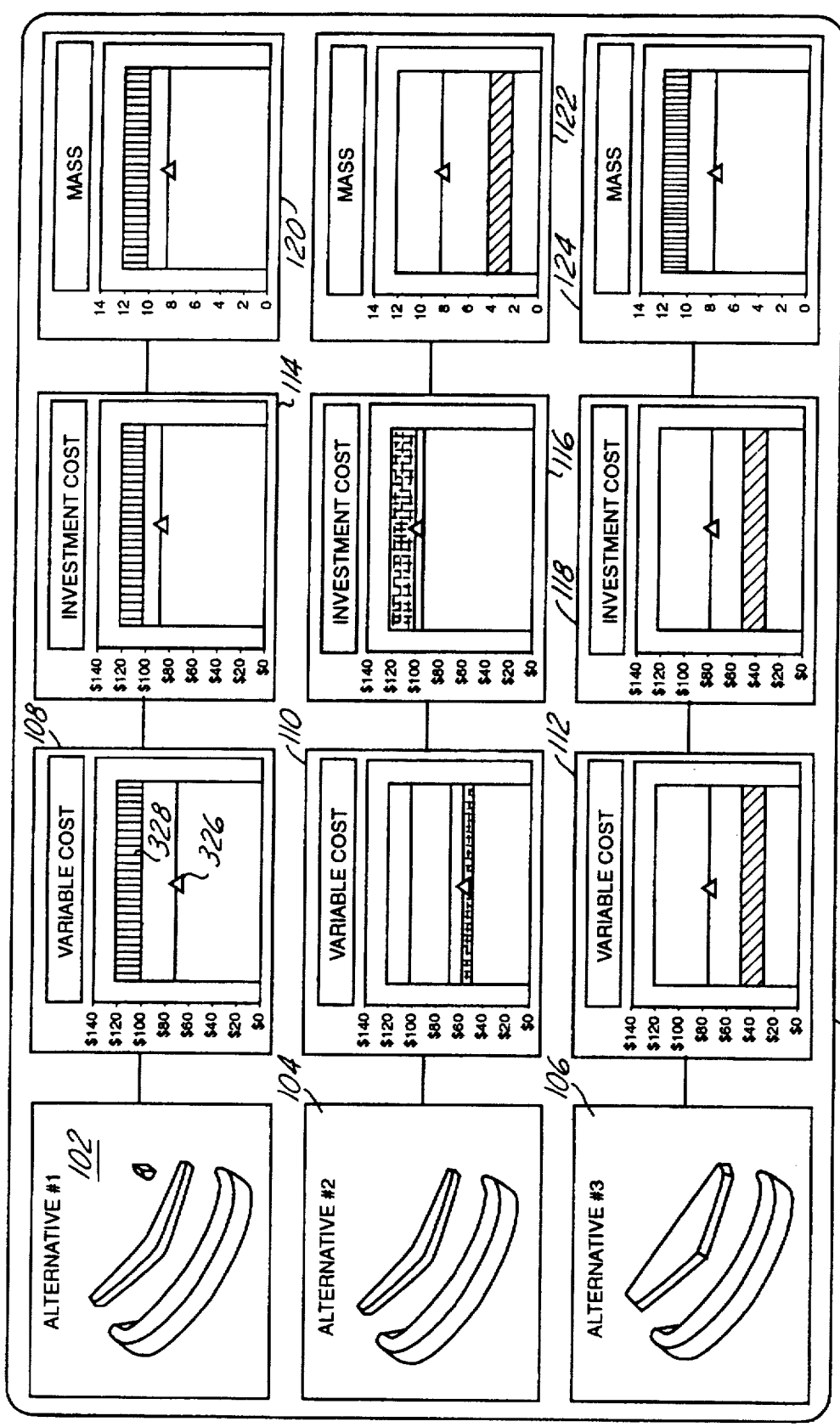
FIG. 9 is a subsystem build strategies evaluation window.

Referring to FIG. 9, the system 50 of the present invention also preferably includes Subsystem Build Strategies Evaluation windows. As with the system builds strategies window 82, the subsystem strategies evaluation window includes graphic indicia 102–106 of each of the alternative subsystems in a particular group.

In the example shown in FIG. 9, three alternative front bumper assemblies are shown graphically in sub-windows 102–106. These graphic indicia of the alternative assemblies may be in the form of simplified exploded perspective views of the assemblies or in other iconic forms which suitably differentiate between the alternatives. Associated with each alternative assembly are objective comparison graphs 108–124 which graphically indicate the current status of each objective relative to the target. For example, sub-window 108 illustrates a variable cost graph for alternative number one indicating a targeted variable cost at $70.00 for the assembly, at 126, and a currently estimated variable cost of between $100 and $120.00.

The graphic indication of the current status of the variable cost in sub-window 108 is preferably color-coded, for example in red, to indicate that it is unacceptably high. Thus, it will be appreciated by those skilled in the art that the variable costs for each of the alternative assemblies shown in sub-windows 102–106 can be quickly compared by viewing sub-windows 108–112.

In the example shown in FIG. 9, alternative three appears to be the current optimal alternative on the basis of variable cost. Some or all of the other objectives may be compared in graphical form in a like manner, such as are shown in the investment costs sub-windows 114–118 and mass sub-windows 120–124. It will be appreciated by those skilled in the art that, where many objective sub-windows are displayed, each sub-window can be displayed in a downsized, iconic representation which can be "zoomed" to a readable size by pointing and clicking the mouse on the desired sub-window (or by other predefined keystrokes). Similarly, a subset of the sub-windows, such as each of the variable cost windows for each of the alternative subassemblies displayed, may simultaneously be enlarged to provide for quick comparison of a common objective among the competing strategies.

Another type of display provided by the system 50 of the present invention is the Interface/Integration Objectives window 126. As with the other objectives displays 68, 70 and 74, the system preferably provides a plurality of Interface Integration Objectives windows corresponding to interface/integration objectives at each level of the project. For example, FIG. 10 illustrates a Systems Interface Integration Objectives window. This display might identify fit and finish interface objectives for the exterior system team. These interface objectives typically include physical interface tolerance objectives, functional integration, and timing objectives. The identification of interfaces, particularly across groups, is critical to overall project integration. For example, merely identifying the fit objective for an instrument panel in the Interface/Integration Objectives window for the side panel subsystem team allows for integration of the instrument panel subsystem team's objectives with the side panel subsystem team. Likewise, identifying an interface objective in the instrument panel subsystem team that the side wall have a critical dimension at the potential physical interface of the side wall with the instrument panel, identifies a potential design incompatibility which otherwise might not be discovered by the instrument panel subsystem team.

Figure 11:
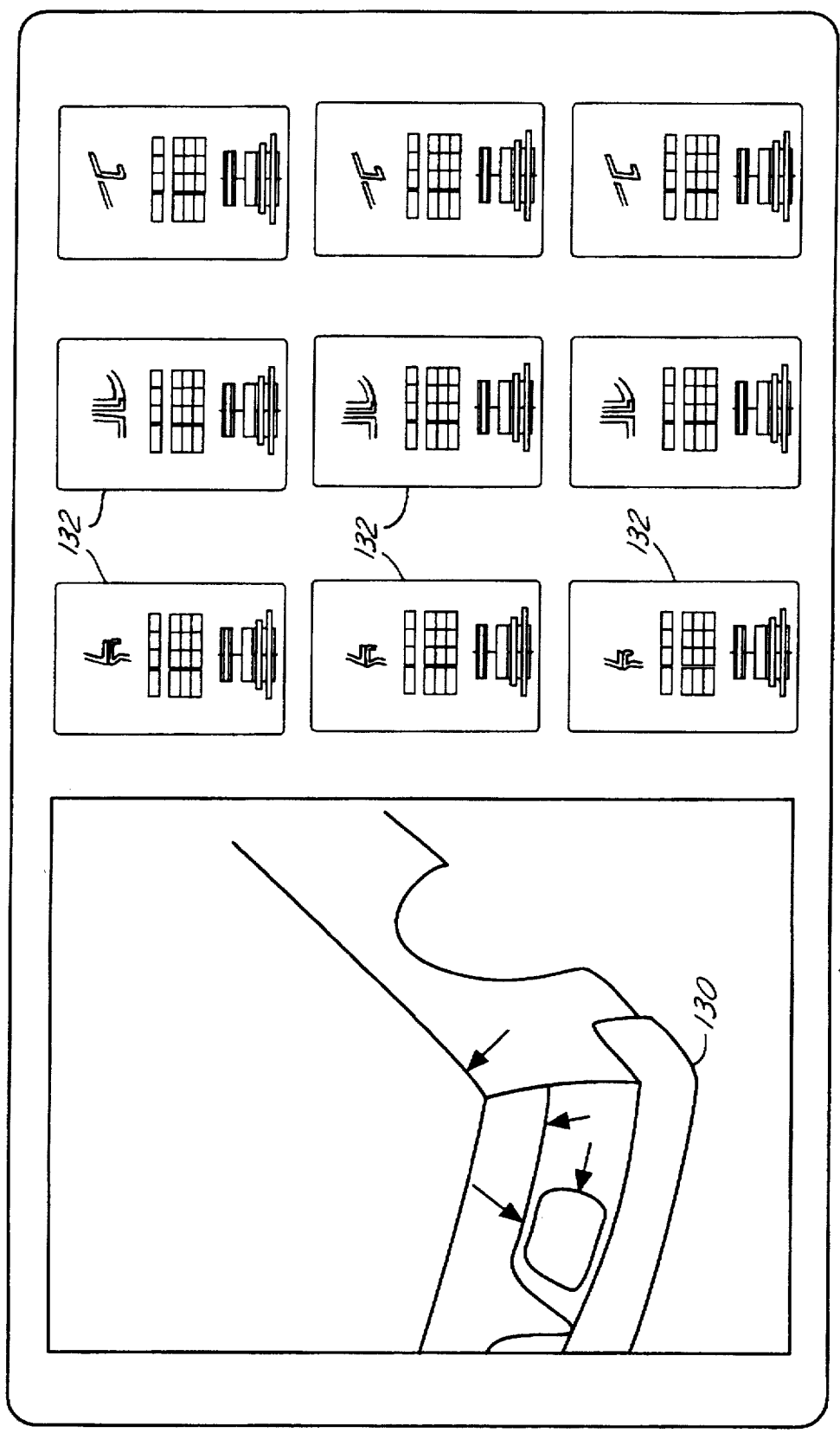
FIG. 11 is a subsystem assembly interface window.

FIG. 11 is a Subsystem Assembly Interface window 128. This window provides a comprehensive display of the interface for a particular subassembly depicted in window 130, and a plurality of components interface detail windows 132, each of which displays detail information relating to a particular interface point in the subassembly shown in window 130. The component interface detail windows 132 may be enlarged, preferably by locating the mouse indicator and clicking on the desired window, to clearly display the interface objectives to the operator. An enlarged component interface detail window 132 is illustrated in FIG. 12.

Figure 13:
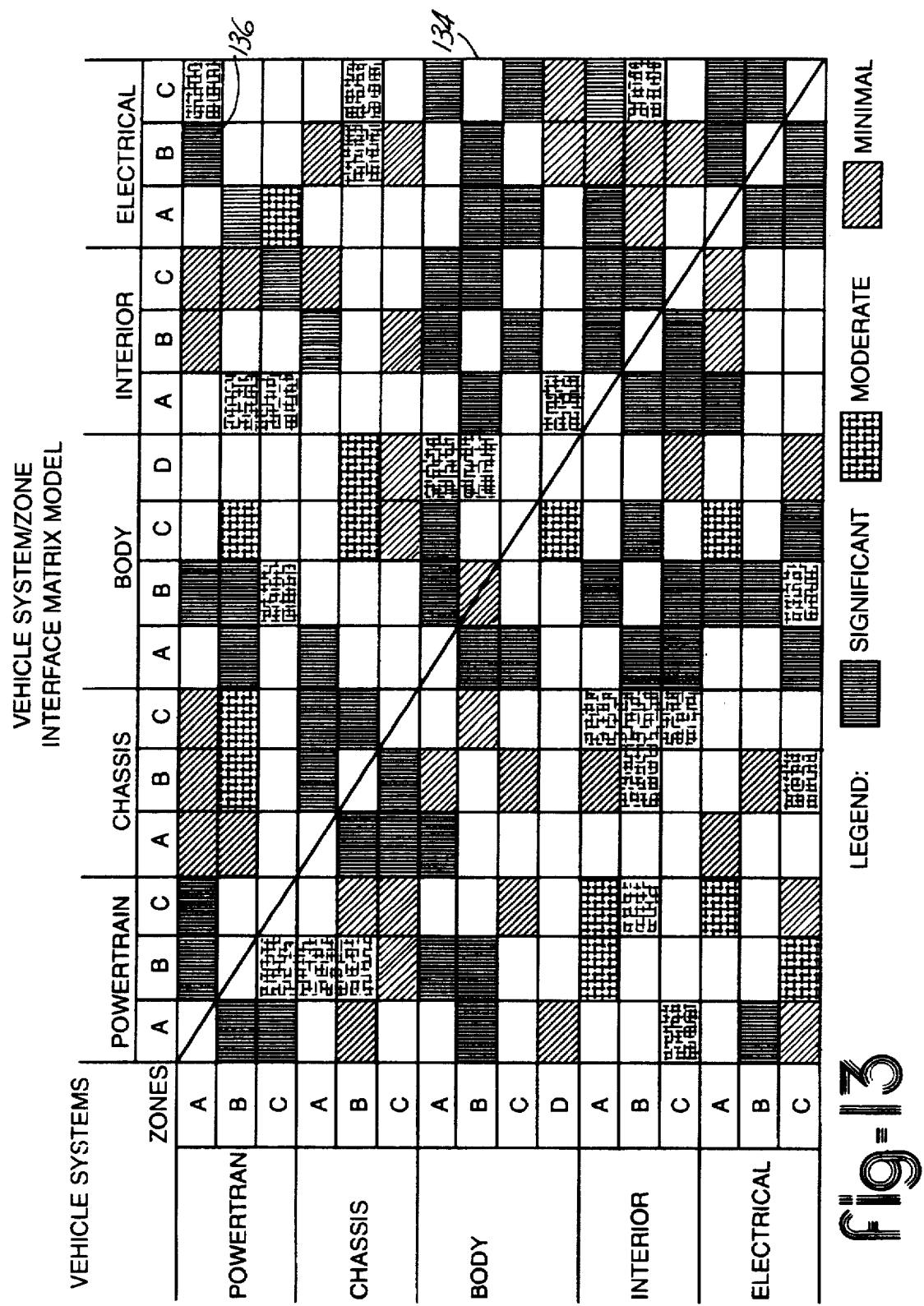
FIG. 13 is a system interface/matrix.

Referring to FIG. 13, the system 50 may provide a system/Zone Interface Matrix window 134 which graphically displays the interrelationship of the system (or subsystem) teams. By utilizing a color-coded matrix, the system 50 can remind the operator that, at 136, there is a significant interrelationship between subsystem team B of the electrical system team (e.g. electronic control modules group), and subsystem team A of the powertrain system (e.g. the emission control system group). By accessing the appropriate interface/integration objectives display for those groups, a project team member can then quickly identify how the two subsystems are interrelated and what effect the current status of the interrelated objectives might have on each of the groups.

In an alternative embodiment, logic can be provided to determine the current status of, for example, each objective of a particular subsystem which potentially affects the objective of another subsystem and, on the basis of predefined criteria interrelating these objectives, produce a vehicle system/zone interface matrix which is color-coded to indicate the current status of the interface. For example, the system could track the critical physical dimensions of the currently selected instrument panel design and compare that critical dimension with the corresponding critical dimension of the currently selected door trim design and, if the dimensions exceed a predefined threshold, indicate the potential physical incompatibility by displaying that block in the matrix corresponding to the interface of those two subsystems teams in red. If the comparison indicates no physical incompatibility, the corresponding block on the interface matrix would be displayed in green. If the critical dimensions are within some predefined range, the interface matrix might display the corresponding block as yellow. Thus, a potential interface problem can be quickly identified, even where the status of each of the group's project indicates that their own objectives are on target.

Figure 14:
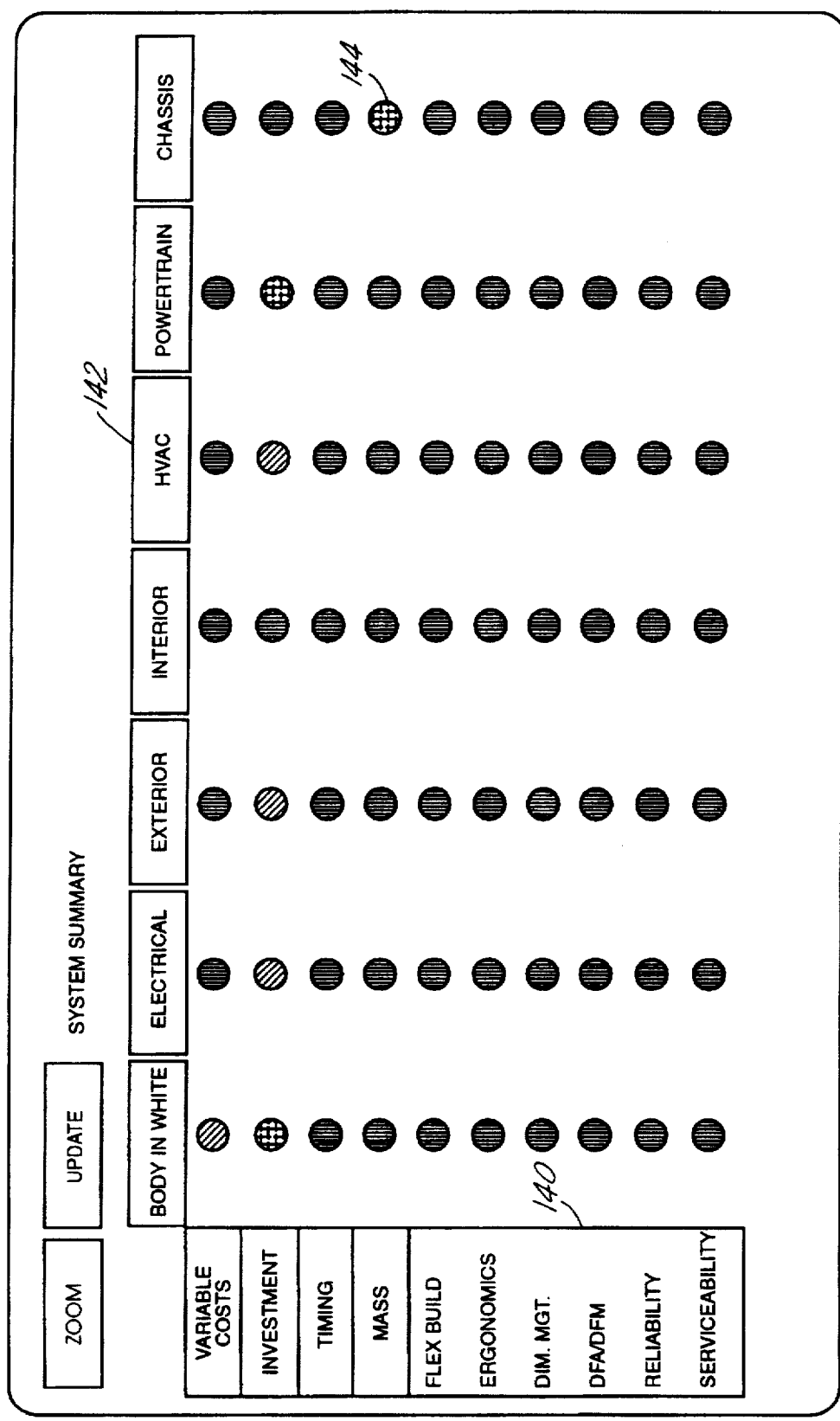
FIG. 14 is a vehicle summary window.

Referring now to FIG. 14, the system 50 preferably also includes a System Summary window 138 which allows the operator to discover the status of each of the vehicle systems'progress toward meeting their respective objectives. In the System Summary window 138 shown, the vehicle objectives are listed on the vertical axis 140, and each of the vehicle systems are listed on the horizontal axis 142, defining a matrix into which graphic indicia of the status of each system's progress toward each objective is displayed. In the display of FIG. 14, the graphic indicia are simply one of three color dots, with a red dot indicating that that particular system is not currently on track to meet that particular objective. The yellow dot indicates that obtaining the objective is in doubt, while a green dot indicates that the respective system group is currently expected to meet their respective objectives.

It will be appreciated by those skilled in the art that various different criteria can be utilized to establish whether a particular group is failing, in doubt, or succeeding in meeting its objectives. For example, the status indicator at 144 reflects that the chassis team is currently on track to meet their mass objectives. The criteria for a green status might be that the total expected chassis mass is less than the target. For example, each of the chassis subsystems (displayed in FIG. 15) current expected mass is less than their respective targets, yielding a green status for chassis system mass. Another alternative criteria might be a weighted percentage of each of the subsystems, or a user-defined series of ranges of variance from the target, with, for example, green status indicating that all subsystems are within 10% of their target mass, yellow status indicating that all subsystems are within 15%, and red status indicating that one (or more as defined) of the subsystems is greater than 20% in excess of its mass target.

It will also be appreciated by those skilled in the art that various algorithms can be developed for each objective for determining the status of that objective. Indeed, the system 50 allows for the user to define the criteria and/or create algorithms for determining the status of these objectives, thereby providing a significant degree of flexibility in tailoring the application of the system to the particular project with which it is utilized. Once defined, the System Summary window provides a simple yet comprehensive picture of the status of the entire system.

The system 50 can also be adapted to provide instant access to more detailed displays from the System Summary window 138. For example, by clicking on any one of the system labels on the horizontal axis 142, the corresponding Sub-system Summary window (illustrated in FIGS. 15–21) could be displayed. Similarly, the system can be provided with the capability of generating, for example, one of the System Details windows (shown in FIGS. 22–25) whenever the operator clicks on the dot corresponding to that particular objective and system in the System Summary window 138.

The system 50 also preferably provides a plurality of status displays for each of the individual vehicle subsystems, such as the Chassis Summary window 146 illustrated in FIG. 15. In the embodiment shown, the Chassis Summary window 146 identifies each of the system (and/or sub-system) objectives on the vertical axis and the total chassis system and chassis subsystems on the horizontal axis. In this display, the actual current status of each objective is displayed in green where the subsystem or system is on target to meet that objective, and a −1 is displayed in red where the chassis system or one of its subsystems is not currently expected to meet its respective target for that objective. It will be appreciated by those skilled in the art that the system 50 might alternatively display actual values, color-coded, or with some other graphic indicia of the progress (or lack of progress) toward meeting each objective.

The Chassis Summary window 146 of FIG. 15, as well as the HVAC Summary window 148, Powertrain 150, Interior 152, Exterior 154, Electrical 156, and Body-in-White 158 of FIGS. 16–21, provide the system operator with an additional level of detail for each of the vehicle systems and their subsystems along with a summary indication of the current status for each of the subsystems.

It will be appreciated by those skilled in the art that, the System Summary window of FIG. 14, and each of the sub-system Summary windows of FIGS. 15–21 can be modified to provide various additional information, or to provide the same information using different graphical indicia of the progress of each of the groups toward attaining their objectives. Also, depending on the size of the project, summary displays may also be generated by the system 50 for each of the component level groups. In this manner, the operator can quickly review the current status of the project at all levels.

Referring now to FIGS. 22–25, an additional level of project detail may be provided in detail displays such as, for example, the Variable Cost Detail window 160, Investment Detail window 162, Timing window 164, and Mass Detail window 166.

In the Variable Costs Detail window 160 shown in FIG. 22, a spread sheet of a series of estimates and variable costs for the entire vehicle and each of its systems at various stages of the product is provided, along with the targets and the total variable costs estimated at various stages in the project. This detail sheet can be used to gauge trends as well as to ascertain the current variable cost information for the project.

It will be appreciated by those skilled in the art that detail windows for each objective may be provided by the system 50, allowing an operator quick access to detailed breakdowns of project data by system, subsystems, and components in a series of mouse clicks or keystrokes.

Figure 26:
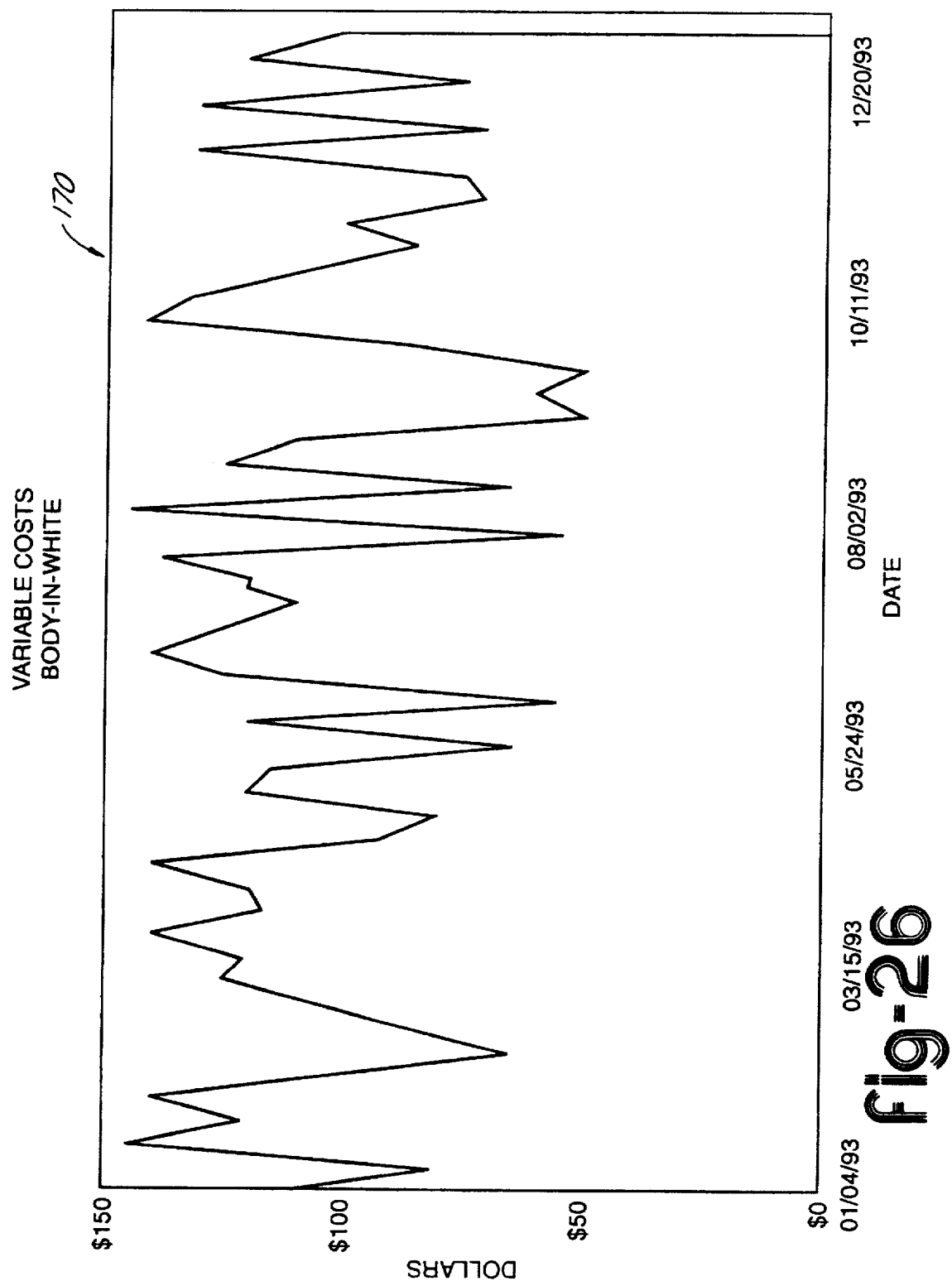
FIG. 26 is an example of graphical data illustrating projected variable costs for the body-in white group for a selected period of the project.

As shown in FIG. 26, the data contained in each of the detail windows 160–166 may also be displayed graphically, as shown for example in the Graphs window 170, providing a snapshot of the trend of a particular group's progress in reaching a particular objective. These graphs might be obtained by clicking on the "graphs" buttons 168 provided in each of the detail displays shown in FIGS. 21–25, or by any series of predefined keystrokes.

Figure 27:
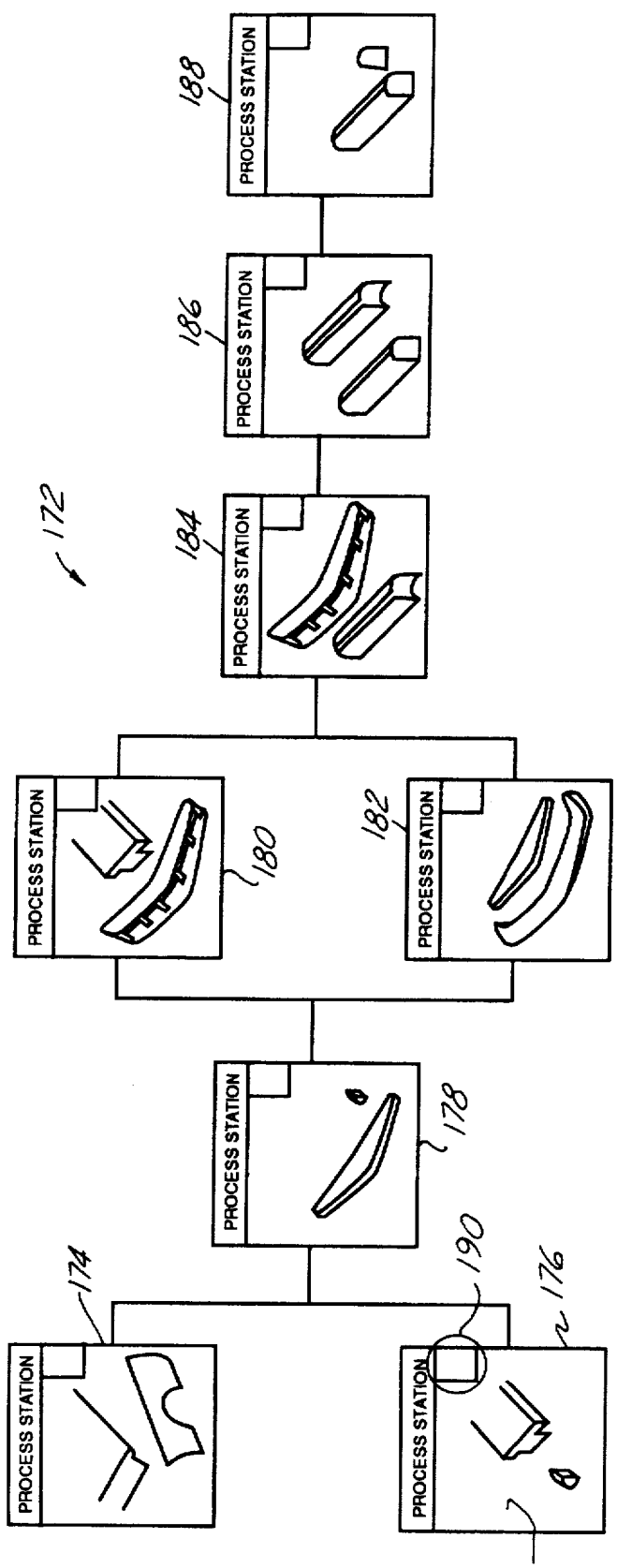
FIG. 27 is an assembly process window.
Figure 28:
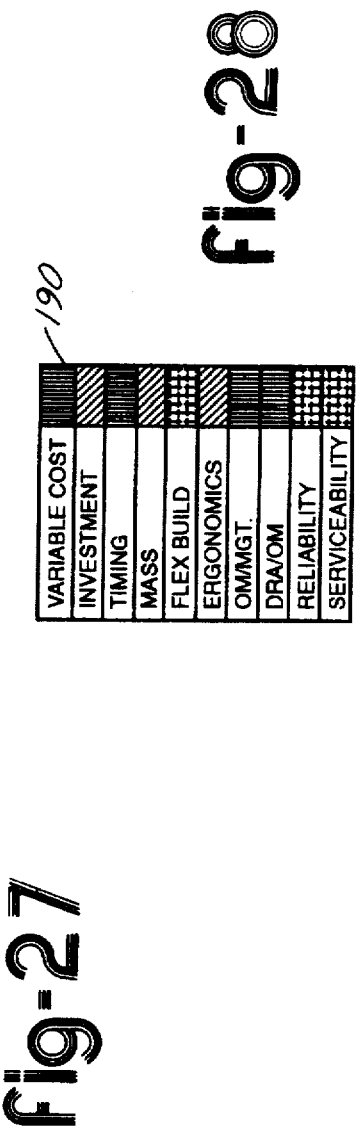
FIG. 28 is an objectives status sub-window.

FIGS. 27 and 28 illustrate a component assembly process window 172 which depicts the assembly process for one or more component assembly groups. Each of the steps in the assembly process is depicted as a sub-window 174–188. The sub-windows are arranged to display the timing of the assembly, with graphic indicia in each of the sub-windows indicating the components involved in each step of the process. An objectives sub-window 190 (shown enlarged in FIG. 28) lists the objectives associated with each assembly step along with some graphic indicia of the status of those objectives. As with the other windows generated by the system 50, a mouse click or a series of keystrokes may be utilized to produce additional information relating to any of the components depicted in the sub-windows 174–188.

Figure 29:
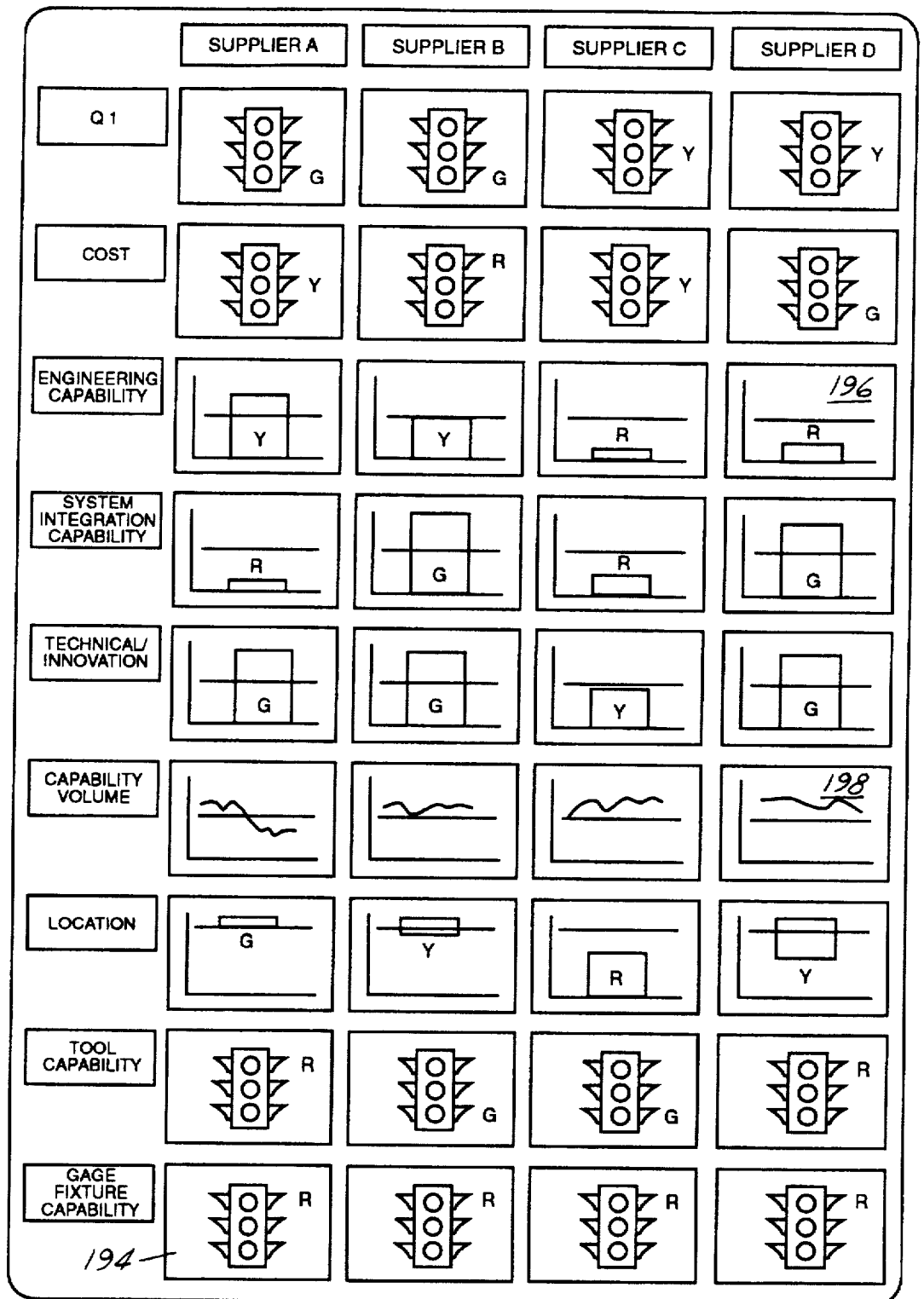
FIG. 29 is a supplier selection window.

Referring now to FIG. 29, the system 50 may provide a Supplier Summary window 192 which identifies supplier objectives (such as those displayed in the vertical axis) and potential suppliers (displayed in the horizontal axis) forming a matrix including graphic indicia of how each supplier rates in its capability to achieve the defined objectives. In the Supplier Summary window 192 shown, various graphic indicia are utilized. For example, stoplight icons 194 may be utilized to provide simple three-color-coded rating, where green indicates acceptability, yellow indicates doubtful capability, and red indicates a lack of capability. Color-coded bar graphs 196 and color-coded line graphs 198 may also be utilized to provide simple graphic indication of each supplier's capability, allowing for quick comparison of suppliers. Again, as with other summary windows, additional detail may be displayed by the system in response to clicking on a selected sub-window (194–198) or in response to other predefined keystrokes.

Figure 30:
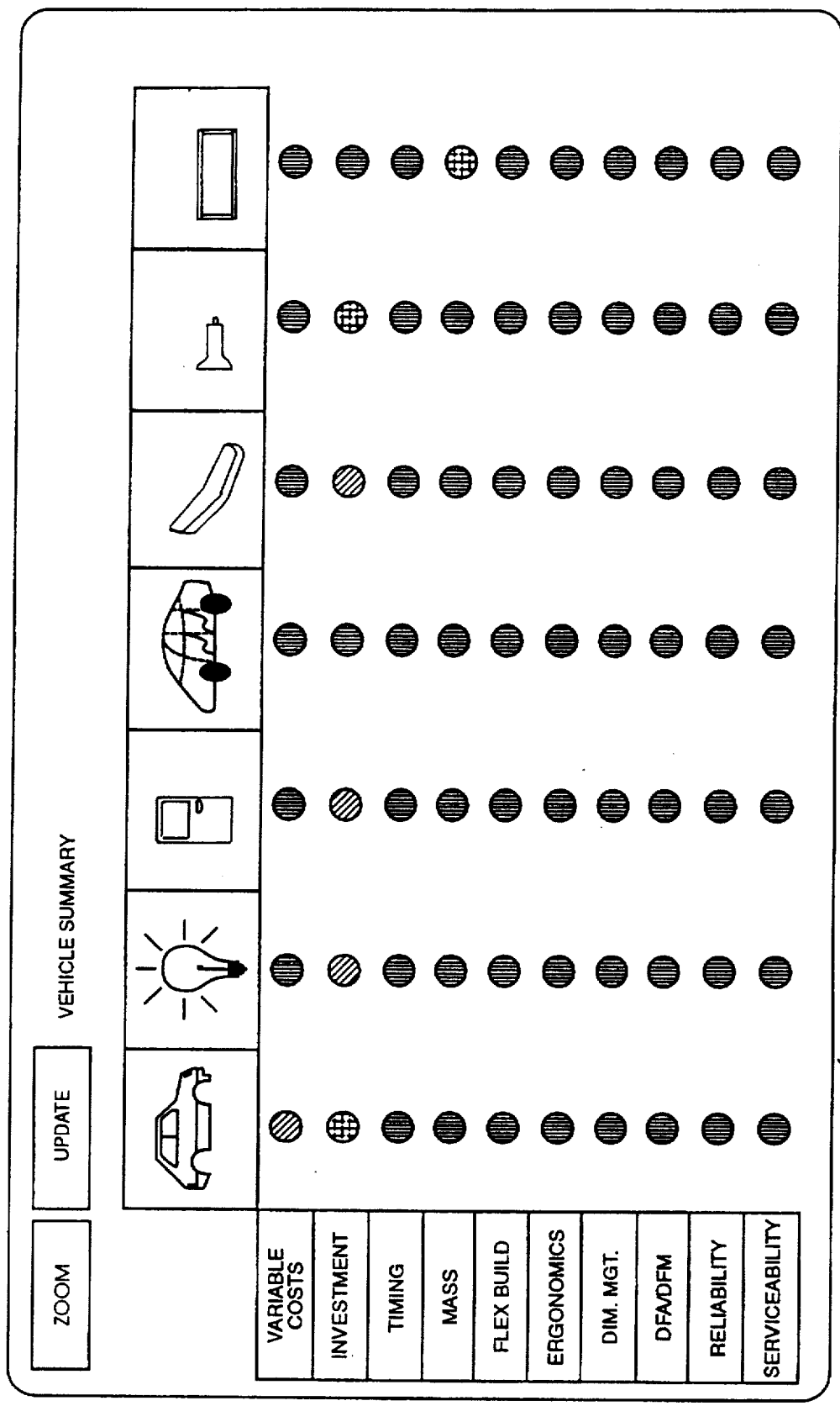
FIG. 30 is an alternative vehicle summary window.

FIG. 30 illustrates an alternative Vehicle Summary window 200 wherein graphical icons are utilized to identify the vehicle systems. Again, it will be appreciated by those skilled in the art that various forms of the displays may be utilized without departing from the spirit of the invention.

Figure 31:
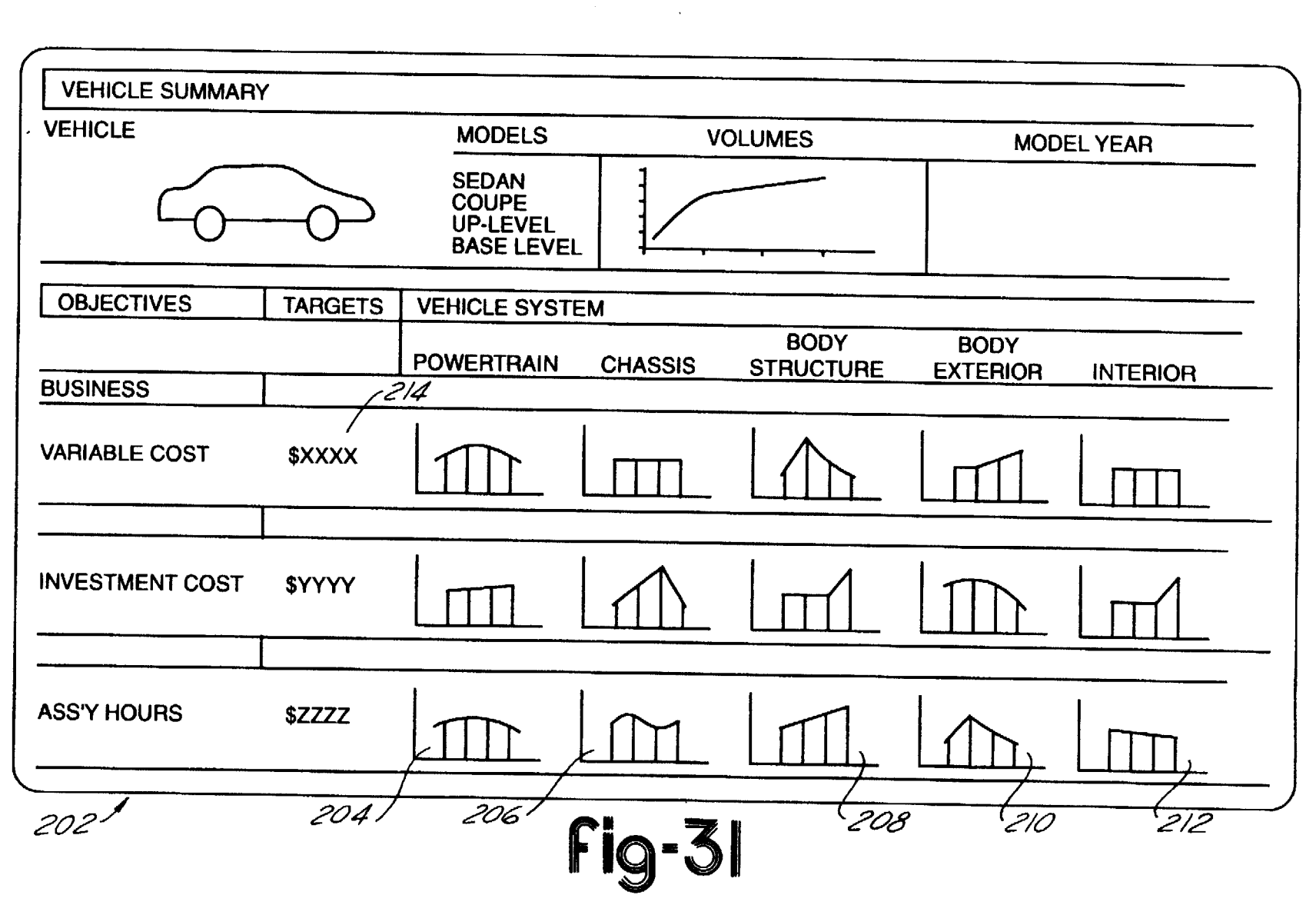

Referring now to FIG. 31, an alternative form of Vehicle Summary window 202 may be generated by the system 50 which utilizes a series of more detailed graphs 204–212 to indicate the status of each of the systems toward meeting their respective objectives. In the Vehicle Summary window 202 shown, a series of business objectives are indicated along with the vehicle targets for each of those objectives (at 214). Each of the systems' status is graphically displayed in a series of graphs 204–212 which are preferably color-coded (not shown) to indicate whether the current status meets the objective, is in doubt, or is unacceptable. Again, various criteria can be established for determining whether a particular system satisfies its objectives. Also, as with the other windows supported by the system 50 of the present invention, additional detail may be obtained by the operator by positioning the mouse pointer over, for example, one of the graphs 204–212, or by other predefined keystrokes. It will be appreciated by those skilled in the art that, as with the other summary windows supported by the system 50, the Vehicle Summary window 202 provides an integrated look at each of the systems' progress toward the commonly objectives as well as the cumulative vehicle targets for each of these objectives.

Figure 32:
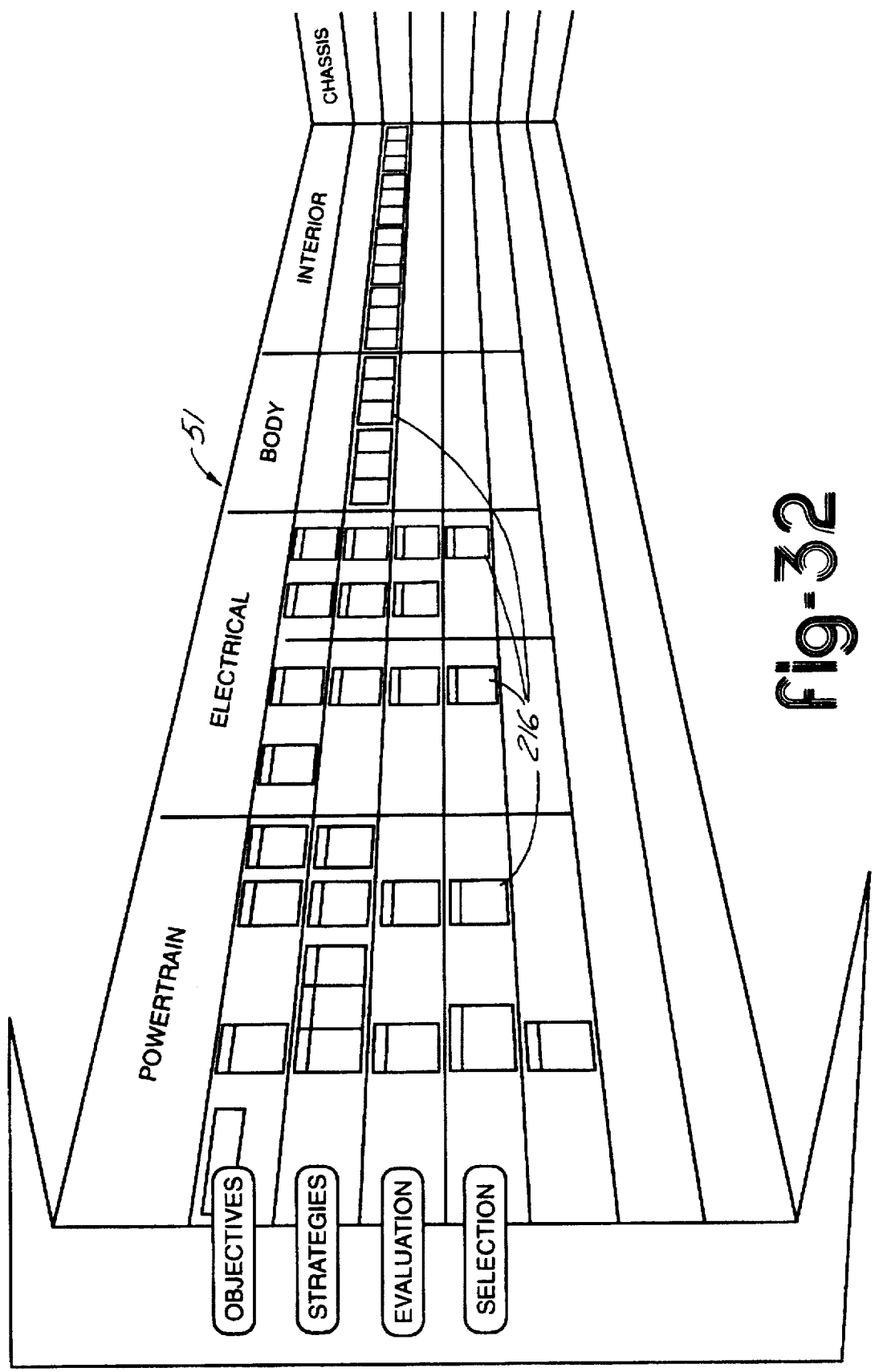
FIG. 32 is a multi-display embodiment of the present invention showing a plurality of system windows.
Figure 33:
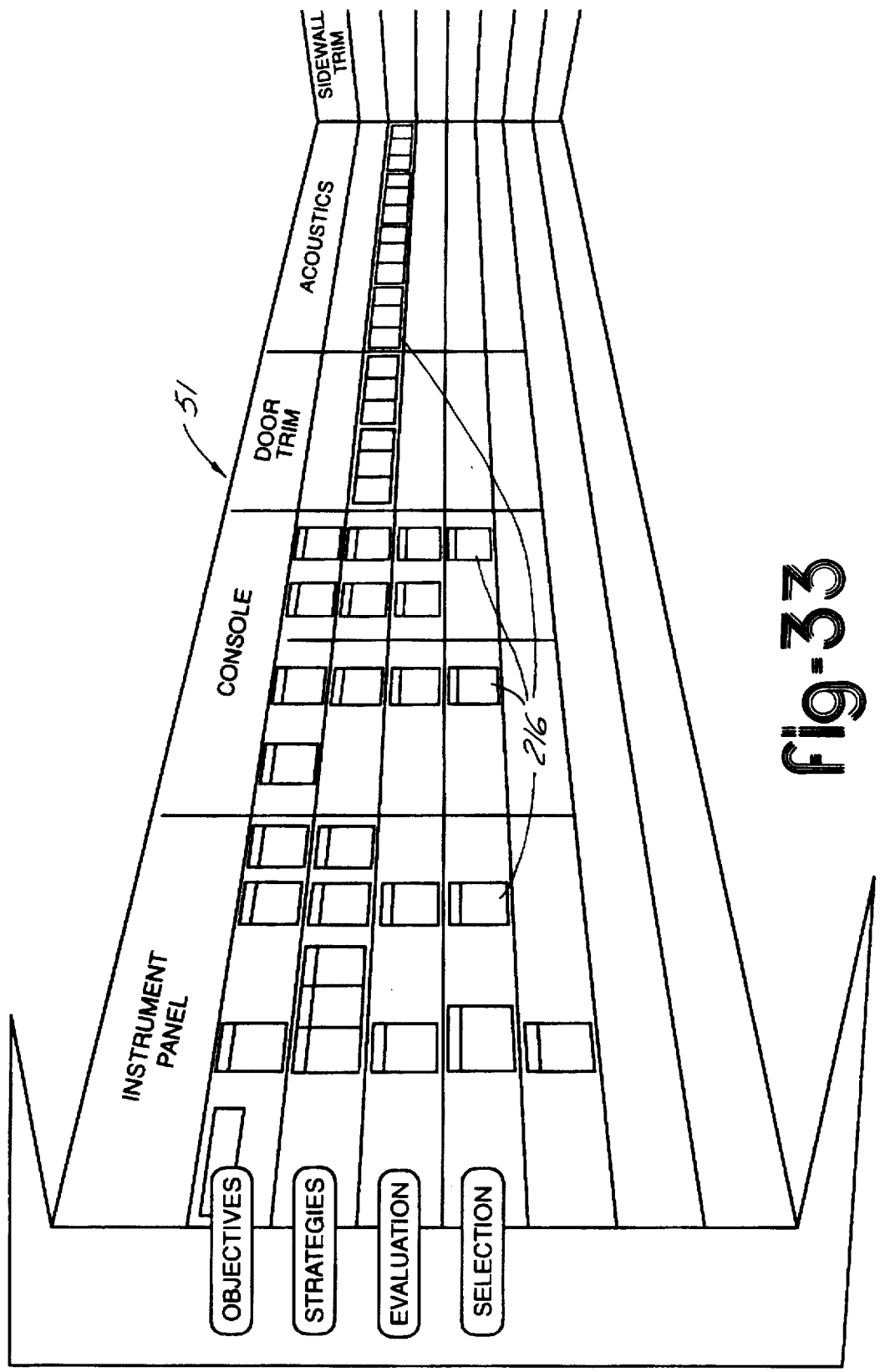
FIG. 33 is a multi-display embodiment of the present invention showing subsystem windows.
Figure 34:
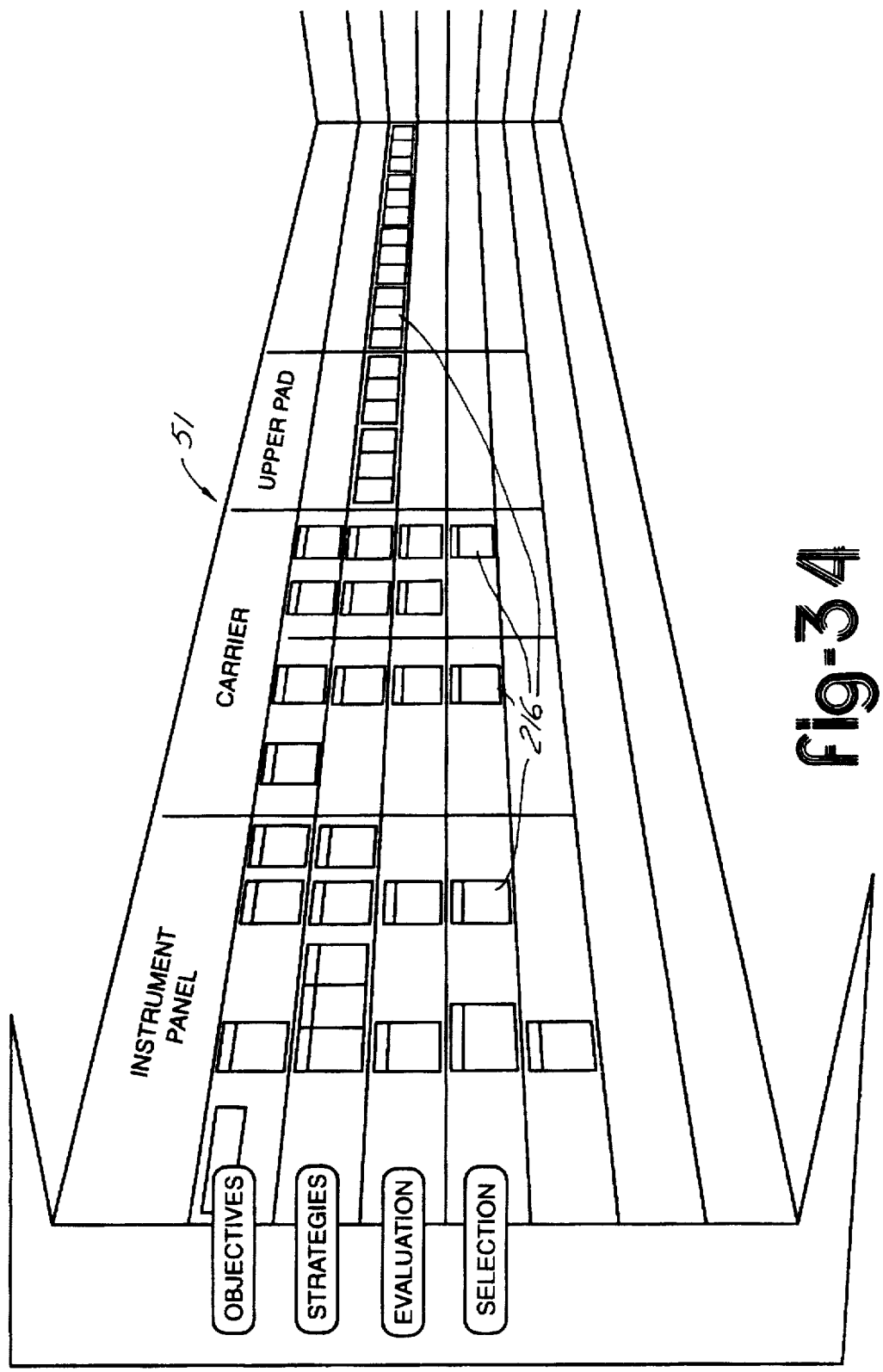
FIG. 34 is a multi-display embodiment of the present invention showing component windows.

In an alternative large scale, multi-display embodiment of the present invention shown in FIGS. 32–34, multiple displays containing the various forms of information described and shown in FIGS. 4–31 on a single wall, thereby allowing one or more operators to view project information at various levels of detail by scanning the plurality of displays rather than by switching between displays on a smaller (e.g. 1 or 2 CRT) display system. In FIG. 32, project information is displayed on a plurality of displays 216 which are physically organized by vehicle system groups. In this alternative embodiment of the system 51, the displays in the powertrain group would typically include a Powertrain Objectives display, one or more Build Strategies displays identifying the selected build strategy as well as any alternative strategies, Powertrain Interface/Integration display(s), a Powertrain Summary display, and various Powertrain Detail displays, graphs, and other powertrain group project data. Each of the other systems would similarly include the project information, organized in the manner described above in connection with FIGS. 4–31, to provide a comprehensive, integrated project data center.

This multi-display arrangement can be repeated at each project group level. For example, a subsystem group display, such as the type shown in FIG. 33, and component groups displays, such as shown in FIG. 34, could be organized and assembled in the alternative multidisplay system 51 of the present invention in much the same manner as the system displays of FIG. 31 to provide increasing levels of detail in a massive multi-user, multidisplay environment.

Thus, the various embodiments of the system of the present invention provide an integrated project management system which allows for the efficient design and engineering of a multicomponent project by providing the vehicle for a coordinated common project definition and project objectives. The system also allows for constant review of the project at all levels of detail to determine where objectives are being met, where failure to meet objectives might affect other groups' progress, and when and where adoption of alternative strategies might advance the project.

While the present invention has been described primarily in the context of its use in a vehicle design project, it clearly has an application in the management of any design, engineering, and/or manufacturing project involving a complex, multi-component product. Indeed, the management system 50 of the present invention is useful in the management of any project which must integrate business, technical, and graphic data.

While the best mode for carrying out the invention has been described in detail, those familiar with the art to which this invention relates will recognize various alternative designs and embodiments for practicing the invention as defined by the following claims.

What Is claimed is:

1. A design decision support system for managing the design and engineering of a product which includes a plurality of components, the system comprising:

a microprocessor;

program memory operably connected to the microprocessor;

data input means operably connected to the microprocessor;

at least one display operably connected to the microprocessor;

first logic employed by the microprocessor for identifying a plurality of product design objectives and simultaneously displaying each of the product design objectives;

second logic employed by the microprocessor for identifying one or more groups, with each group responsible for the design of a subset of one or more of the components, identifying a plurality of group design objectives relating to each of the identified groups, and simultaneously displaying each of the groups and their respective objectives;

third logic employed by the microprocessor for monitoring the performance of each group during the project by measuring progress toward the stated design objectives and simultaneously displaying graphical indicia of the progress toward a selected plurality of the design objectives.

2. The invention of claim 1 wherein the product design objectives are displayed in a product objectives window which simultaneously lists each of the objectives, quantitative targets corresponding to each of the objectives, and graphic indicia of the progress toward reaching the objectives.

3. The invention of claim 1 wherein display of the group design objectives includes a plurality of group design objectives windows, each including a list of the product design objectives, the quantitative targets for that group relating to those product design objectives, and graphic indicia of the status of that group's progress toward reaching its targets.

4. The invention of claim 1 further including fourth logic for identifying a plurality of alternative design strategies for achieving selected group objectives and simultaneously displaying the alternative design strategies.

5. The invention of claim 4 wherein the display of each of the strategies includes an alternative build strategies window including graphic indicia of each of the strategies.

6. The invention of claim 4 further including fifth logic for evaluating the strategies based upon predefined factors and simultaneously displaying selected evaluation factors for each of the alternative design strategies.

7. The invention of claim 6 including logic for generating a build strategies evaluation window having unique graphic indicia corresponding to each of a plurality of displayed alternative build strategies and, for each of the displayed strategies, including graphic indicia relating to the evaluation of at least one of the objectives, whereby the alternative build strategies can be compared.

8. The invention of claim 1 wherein the second logic includes logic for displaying selected components from a selected assembly of components in a component window including graphic indicia of the selected components in the assembly and, associated with each of the graphic indicia, a sub-window identifying the component design objectives associated with that component.

9. The system of claim 1 wherein the product design objectives include business objectives, technical objectives, or timing objectives, or any combination thereof.

10. The system of claim 9 wherein the business objectives include variable costs, investment costs, assembly processing and tooling costs and manufacturing processing and tooling costs, or assembly hours, or any combination thereof.

11. The system of claim 9 wherein the product is a vehicle and the technical objectives include total vehicle mass, fuel economy, noise level, reliability, quality, or serviceability, or any combination thereof.

12. The system of claim 1 wherein the group design objectives include business objectives, technical objectives, or timing objectives, or any combination thereof.

13. The system of claim 12 wherein the business objectives include variable costs, investment costs, assembly processing and tooling costs and manufacturing processing and tooling costs, or assembly hours, or any combination thereof.

14. The system of claim 12 wherein the product is a vehicle and the technical objectives include mass, fuel economy, noise level, reliability, quality, or serviceability, or any combination thereof.

15. The system of claim 1 wherein the third logic includes logic for providing an interface matrix window with graphic indicia of the degree of interrelationship between the objectives of selected groups.

16. The system of claim 1 wherein the graphical indicia of the progress towards a selected plurality of the design objectives is color.

17. The system of claim 1 further including a plurality of displays, wherein the first logic includes logic for displaying each of the product design objectives at least one of the plurality of displays, the second logic includes logic for displaying group design objectives for one of the plurality of groups on at least another one of the plurality of displays.

18. A design and engineering project decision support system comprising:

a microprocessor;

memory operably connected to the microprocessor;

one or more displays operably connected to the microprocessor;

data input means operably connected to the microprocessor;

first logic employed by the microprocessor for identifying a plurality of project design objectives and simultaneously displaying each of the design objectives;

second logic employed by the microprocessor for identifying alternative strategies for achieving the design objectives and simultaneously displaying each of the alternative strategies;

third logic employed by the microprocessor for evaluating the alternative strategies based upon predefined factors and simultaneously displaying the evaluation factors and results for each strategy; and fourth logic employed by the microprocessor for selecting the optimal strategy for achieving the design objectives and displaying the optimal strategy.

19. A decision support system for managing the design of a product incorporating a plurality of components by one or more groups, each group being responsible for the design of a subset of the components, the system comprising:

a microprocessor;

memory operably connected to the microprocessor;

one or more displays operably connected to the microprocessor;

first logic for identifying project design objectives and means for displaying each of the objectives;

second logic for identifying a plurality of group design objectives for each group, each set of group design objectives relating to the components associated with the group, and means for displaying each of these sets of group design objectives;

third logic for identifying alternative strategies for achieving the group design objectives, and means for simultaneously displaying each of the strategies;

fourth logic for evaluating the strategies based upon predefined factors, and means for simultaneously displaying the factors for each strategy; and fifth logic for selecting the strategy for each group which is optimal in achieving the product design objectives, and means for displaying each of the strategies selected.

20. In an automotive vehicle design and engineering project having a group responsible for the overall project, and a plurality of systems groups, each responsible for design and engineering of a predefined portion of the vehicle, a design and engineering project management system, the system comprising:

a microprocessor;

program memory operably connected to the microprocessor;

at least one display operably connected to the microprocessor;

first means for identifying a plurality of overall vehicle design and engineering objectives and simultaneously displaying each of the vehicle objectives;

second means for identifying a plurality of system design objectives relating to each of the systems groups and simultaneously displaying each of system design objectives for a selected systems group;

third means for identifying alternative strategies for achieving the system design objectives and simultaneously displaying the alternative strategies for a selected systems group;

fourth means for evaluating the alternative strategies based upon predefined factors and simultaneously displaying the strategies, the predefined factors, and the results of the evaluations in graphical form; and fifth means for selecting the strategy for each systems group which is optimal in achieving the vehicle design objectives and displaying each of the strategies selected.

* * * * *